(12) United States Patent
Hattori et al.

(10) Patent No.: US 8,728,590 B2
(45) Date of Patent: May 20, 2014

(54) LIQUID CRYSTAL COMPOSITION AND LIQUID CRYSTAL DISPLAY DEVICE

(75) Inventors: Norikatsu Hattori, Chiba (JP); Kazuhiko Saigusa, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

(21) Appl. No.: 13/699,644

(22) PCT Filed: May 24, 2011

(86) PCT No.: PCT/JP2011/061839
§ 371 (c)(1),
(2), (4) Date: Nov. 23, 2012

(87) PCT Pub. No.: WO2011/148928
PCT Pub. Date: Dec. 1, 2011

(65) Prior Publication Data
US 2013/0062560 A1    Mar. 14, 2013

(30) Foreign Application Priority Data

May 28, 2010   (JP) .................................. 2010-122279

(51) Int. Cl.
*C09K 19/34* (2006.01)
*C09K 19/30* (2006.01)
*C09K 19/32* (2006.01)
*C09K 19/12* (2006.01)
*C09K 19/20* (2006.01)

(52) U.S. Cl.
USPC .................. 428/1.1; 252/299.61; 252/299.62; 252/299.63; 252/299.66; 252/299.67

(58) Field of Classification Search
USPC ............ 428/1.1; 252/299.01, 299.61, 299.62, 252/299.66, 299.67
See application file for complete search history.

(56) References Cited

U.S. PATENT DOCUMENTS

| | | | |
|---|---|---|---|
| 6,690,657 B1 * | 2/2004 | Lau et al. | 370/315 |
| 7,081,279 B2 * | 7/2006 | Kato et al. | 428/1.1 |
| 8,399,073 B2 * | 3/2013 | Klasen-Memmer et al. | 428/1.1 |
| 2011/0248216 A1 * | 10/2011 | Klasen-Memmer et al. | 252/299.62 |

FOREIGN PATENT DOCUMENTS

| | | |
|---|---|---|
| CN | 101519594 | 9/2009 |
| JP | 2003-327965 | 11/2003 |
| JP | 2008-024815 | 2/2008 |
| JP | 2008-505235 | 2/2008 |
| JP | 2008-273957 | 11/2008 |
| JP | 2008-285570 | 11/2008 |
| JP | 2009-035630 | 2/2009 |
| WO | 2010072370 | 7/2010 |
| WO | 2010119779 | 10/2010 |

OTHER PUBLICATIONS

English translation for JP 2008-273957 provided by Derwent.*

* cited by examiner

*Primary Examiner* — Shean C Wu
(74) *Attorney, Agent, or Firm* — Jianq Chyun IP Office

(57) ABSTRACT

The liquid crystal composition having a negative dielectric anisotropy contains two ring compound having a large optical anisotropy and a negatively large dielectric anisotropy as the first component, three ring compound having a large maximum temperature and a large dielectric anisotropy as the second component, three ring compound having a large optical anisotropy and a large dielectric anisotropy as the third component, and two ring compound having a small viscosity as the fourth component. The liquid crystal display device contains the compositions.

17 Claims, No Drawings

LIQUID CRYSTAL COMPOSITION AND LIQUID CRYSTAL DISPLAY DEVICE

CROSS-REFERENCE TO RELATED APPLICATION

This application is a 371 of international application of PCT application serial no. PCT/JP2011/061839, filed on May 24, 2011, which claims the priority benefit of Japan application no. 2010-122279, filed on May 28, 2010. The entirety of each of the above-mentioned patent applications is hereby incorporated by reference herein and made a part of this specification.

TECHNICAL FIELD

The invention relates to a liquid crystal composition mainly suitable for use in an active matrix (AM) device and so forth, and an AM device and so forth containing the composition. More specifically, the invention relates to a liquid crystal composition having a negative dielectric anisotropy, and a device that contains the composition and has a mode such as an in-plane switching (IPS) mode, a vertical alignment (VA) mode, a fringe field switching (FFS) mode or a polymer sustained alignment (PSA) mode.

BACKGROUND ART

In a liquid crystal display device, a classification based on an operating mode for liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode, and a polymer sustained alignment (PSA) mode. A classification based on a driving mode in the device includes a passive matrix (PM) and an active matrix (AM). The PM is further classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type according to a production process. A classification based on a light source includes a reflective type utilizing natural light, a transmissive type utilizing backlight and a transreflective type utilizing both the natural light and the backlight.

The devices contain a liquid crystal composition having suitable characteristics. The liquid crystal composition has a nematic phase. General characteristics of the composition should be improved to obtain an AM device having good general characteristics. Table 1 below summarizes a relationship between two of the general characteristics. The general characteristics of the composition will be further explained based on a commercially available AM device. A temperature range of the nematic phase relates to a temperature range in which the device can be used. A preferable maximum temperature of the nematic phase is about 70° C. or higher and a preferable minimum temperature of the nematic phase is about −10° C. or lower. Viscosity of the composition relates to a response time in the device. A short response time is preferable for displaying moving images on the device. Accordingly, a small viscosity in the composition is preferable. A small viscosity at a low temperature is further preferable.

TABLE 1

General Characteristics of Composition and AM Device

| No. | General Characteristics of Composition | General Characteristics of AM Device |
|---|---|---|
| 1 | wide temperature range of a nematic phase | wide usable temperature range |
| 2 | small viscosity [1] | short response time |
| 3 | suitable optical anisotropy | large contrast ratio |
| 4 | large positive or negative dielectric anisotropy | low threshold voltage and small electric power consumption large contrast ratio |
| 5 | large specific resistance | large voltage holding ratio and large contrast ratio |
| 6 | high stability to ultraviolet light and heat | long service life |

[1] A liquid crystal composition can be injected into a liquid crystal cell in a shorter period of time.

An optical anisotropy of the composition relates to a contrast ratio in the device. A product ($\Delta n \times d$) of an optical anisotropy ($\Delta n$) of the composition and a cell gap (d) in the device is designed so as to maximize the contrast ratio. A suitable value of the product depends on a type of the operating mode. The suitable value is in the range of about 0.30 micrometer to about 0.40 micrometer in a device having the VA mode, and in the range of about 0.20 micrometer to about 0.30 micrometer in a device having the IPS mode. In the above case, a composition having a large optical anisotropy is preferable for a device having a small cell gap. A large absolute value of a dielectric anisotropy in the composition contributes to a low threshold voltage, a small electric power consumption and a large contrast ratio in the device. Accordingly, the large absolute value of the dielectric anisotropy is preferable. A large specific resistance in the composition contributes to a large voltage holding ratio and a large contrast ratio in the device. Accordingly, a composition having a large specific resistance, at room temperature and also at a high temperature in an initial stage, is preferable. A composition having a large specific resistance, at room temperature and also at a high temperature after the device has been used for a longtime, is preferable. Stability of the composition to ultraviolet light and heat relates to a service life of the liquid crystal display device. In the case where the stability is high, the device has a long service life. Such characteristics are preferable for an AM device used in a liquid crystal projector, a liquid crystal television and so forth.

A composition having a positive dielectric anisotropy is used for an AM device having the TN mode. On the other hand, a composition having a negative dielectric anisotropy is used for an AM device having the VA mode. A composition having a positive or negative dielectric anisotropy is used for an AM device having the IPS mode. A composition having a positive or negative dielectric anisotropy is used for an AM device having the PSA mode. Examples of the liquid crystal composition having the negative dielectric anisotropy are disclosed in Patent literatures No. 1 to No. 4 as described in the following.

REFERENCE LIST

Patent Literature

Patent literature No. 1: JP 2009-035630 A.
Patent literature No. 2: JP 2008-285570 A.
Patent literature No. 3: JP 2008-024815 A.
Patent literature No. 4: JP 2003-327965 A.
Patent literature No. 5: JP 2008-505235 A.

A desirable AM device has characteristics such as a wide temperature range in which a device can be used, a short response time, a large contrast ratio, a low threshold voltage, a large voltage holding ratio and a long service life. A shorter response time even by one millisecond is desirable. Thus, desirable characteristics of a composition include a high maximum temperature of a nematic phase, a low minimum temperature of the nematic phase, a small viscosity, a suitable optical anisotropy, a large positive or negative dielectric anisotropy, a large specific resistance, a high stability to ultraviolet light and a high stability to heat.

SUMMARY OF INVENTION

Technical Problem

One of the aims of the invention is to provide a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. Another aim is to provide a liquid crystal composition having a suitable balance regarding at least two of the characteristics, and particularly satisfying a high optical anisotropy and a large negative dielectric anisotropy. A further aim is to provide a liquid crystal display device containing such a composition. An additional aim is to provide a composition having a suitable optical anisotropy to be a small optical anisotropy or a large optical anisotropy, a large negative dielectric anisotropy, a high stability to ultraviolet light and so forth, and is to provide an AM device having a short response time, a large voltage holding ratio, a large contrast ratio, a long service life and so forth.

Solution to Problem

The invention concerns a liquid crystal composition that has a negative dielectric anisotropy and contains at least one compound selected from the group of compounds represented by formula (1) as a first component, at least one compound selected from the group of compounds represented by formula (2) as a second component, at least one compound selected from the group of compounds represented by formula (3) as a third component and at least one compound selected from the group of compounds represented by formula (4) as a fourth component:

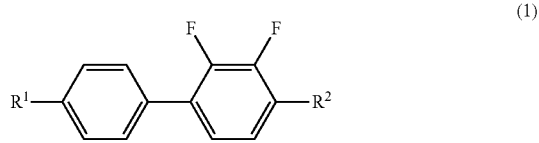
(1)

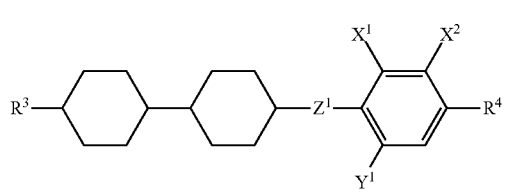
(2)

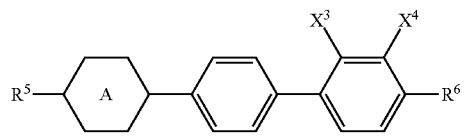
(3)

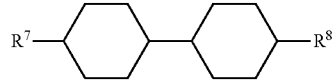
(4)

wherein $R^1$, $R^2$, $R^3$, $R^4$, $R^5$ and $R^6$ are independently alkyl having 1 to 12 carbons, alkoxy having 1 to 12 carbons, or alkenyl having 2 to 12 carbons; $R^7$ is alkyl having 1 to 12 carbons or alkoxy having 1 to 12 carbons; $R^8$ is alkyl having 1 to 12 carbons, alkoxy having 1 to 12 carbons, vinyl or vinyl in which arbitrary hydrogen is replaced with fluorine; ring A is 1,4-cycrohexylene, or 1,4-pnenylene; $X^1$, $X^2$, $X^3$ or $X^4$ are independently fluorine or chlorine; $Y^1$ is independently hydrogen or methyl; $Z^1$ is a single bond or ethylene.

Advantageous Effects of Invention

An advantage of the invention is a liquid crystal composition satisfying at least one of characteristics such as a high maximum temperature of the nematic phase, a low minimum temperature of the nematic phase, a small viscosity, a suitable optical anisotropy, a large negative dielectric anisotropy, a large specific resistance, a high stability to ultraviolet light and a high stability to heat. One aspect of the invention is a liquid crystal composition having a suitable balance regarding at least two of the characteristics. Another aspect is a liquid crystal display device containing such a composition. A further aspect is a composition having a suitable optical anisotropy, a large negative dielectric anisotropy, a high stability to ultraviolet light and so forth, and is an AM device having a short response time, a large voltage holding ratio, a large contrast ratio, a long service life and so forth.

DESCRIPTION OF EMBODIMENTS

Usage of terms in the specification and claims is as described below. A liquid crystal composition or a liquid crystal display device of the invention may be abbreviated as "composition" or "device," respectively. The liquid crystal display device is a generic term for a liquid crystal display panel and a liquid crystal display module. "Liquid crystal compound" means a compound having a liquid crystal phase such as a nematic phase or a smectic phase, or a compound having no liquid crystal phase but being useful as a component of the composition. Such a compound has a six-membered ring such as 1,4-cyclohexylene and 1,4-phenylene, and a rod-like molecular structure. An optically active compound and a polymerizable compound may occasionally be added to the composition. Even in the case where the compounds are liquid crystalline, the compounds are classified as an additive herein. At least one compound selected from the group of compounds represented by formula (1) may be abbreviated as "compound (1)." "Compound (1)" means one compound or two or more compounds represented by formula (1). A same rule applies to any other compound represented by any other formula. "Arbitrary" means that not only positions but also numbers can be selected.

A higher limit of a temperature range of the nematic phase may be abbreviated as "maximum temperature." A lower limit of the temperature range of the nematic phase may be abbreviated as "minimum temperature." An expression "a specific resistance is large" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device was used for a long time. An expression "a voltage holding ratio is large" means that the device has a large voltage holding ratio at room temperature and also at a temperature close to the maximum temperature of the nematic phase in an initial stage, and that the device has a large voltage holding ratio at room temperature and also at a temperature close to the maximum temperature of the nematic phase even after the device was used for a long time. When characteristics such as an optical anisotropy are explained, values obtained according to the measuring methods described in Examples will be used. A first component includes one compound or two or more compounds. A term "a ratio of the first component" is expressed in terms of weight percent (% by weight) of the first component based on the total weight of the liquid crystal composition. A same rule applies to a ratio of the second component and so forth. A ratio of the additive mixed with the composition is expressed in terms of weight percent (% by weight) or weight parts per million (ppm) based on the total weight of the liquid crystal composition.

A symbol $R^1$ is used for a plurality of compounds in chemical formulas of component compounds. $R^1$ to be selected may be identical or different in two of arbitrary compounds among the plurality of compounds. In one case, for example, $R^1$ of compound (1) is ethyl and $R^1$ of compound (1-1) is ethyl. In another case, $R^1$ of compound (1) is ethyl and $R^1$ of compound (1-1) is propyl. The same rule applies to a symbol $R^2$, $Z^1$ or the like.

The invention includes the items described below.

Item 1. A liquid crystal composition that has a negative dielectric anisotropy and contains at least one compound selected from the group of compounds represented by formula (1) as a first component, at least one compound selected from the group of compounds represented by formula (2) as a second component, at least one compound selected from the group of compounds represented by formula (3) as a third component and at least one compound selected from the group of compounds represented by formula (4) as a fourth component:

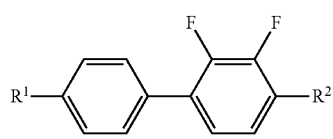
(1)

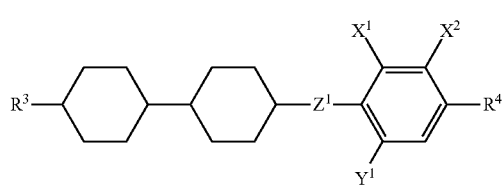
(2)

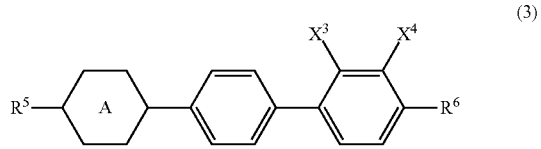
(3)

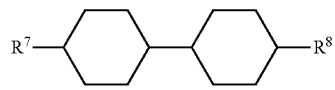
(4)

wherein $R^1$, $R^2$, $R^3$, $R^4$, $R^5$ and $R^6$ are independently alkyl having 1 to 12 carbons, alkoxy having 1 to 12 carbons, or alkenyl having 2 to 12 carbons; $R^7$ is independently alkyl having 1 to 12 carbons or alkoxy having 1 to 12 carbons; $R^8$ is independently alkyl having 1 to 12 carbons, alkoxy having 1 to 12 carbons, vinyl or vinyl in which arbitrary hydrogen is replaced with fluorine; ring A is 1,4-cycrohexylene, or 1,4-pnenylene; $X^1$, $X^2$, $X^3$ and $X^4$ are independently fluorine or chlorine; $Y^1$ is independently hydrogen or methyl; $Z^1$ is independently a single bond or ethylene.

Item 2. The liquid crystal composition according to item 1, wherein the second component is at least one compound selected from the group of compounds represented by formula (2-1) or formula (2-2):

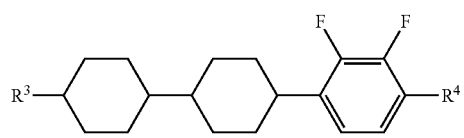
(2-1)

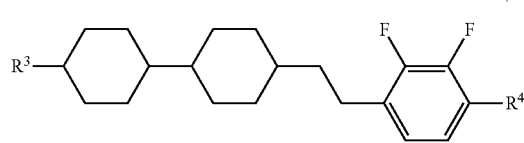
(2-2)

wherein $R^3$ and $R^4$ are independently alkyl having 1 to 12 carbons, alkoxy having 1 to 12 carbons, or alkenyl having 2 to 12 carbons.

Item 3. The liquid crystal composition according to item 1 or 2, wherein the third component is at least one compound selected from the group of compounds represented by formula (3-1):

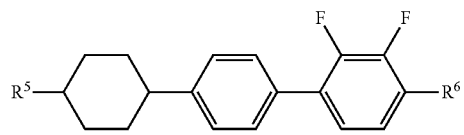
(3-1)

wherein $R^5$ and $R^6$ are independently alkyl having 1 to 12 carbons, alkoxy having 1 to 12 carbons, or alkenyl having 2 to 12 carbons.

Item 4. The liquid crystal composition according to item 1 to 3, wherein the fourth component is at least one compound selected from the group of compounds represented by formula (4-1) or (4-2):

(4-1)

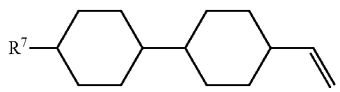
(4-2)

wherein $R^7$, $R^9$ and $R^{10}$ are independently alkyl having 1 to 12 carbons, or alkoxy having 1 to 12 carbons.

Item 5. The liquid crystal composition according to item 2, wherein the second component is at least one compound selected from the group of compounds represented by formula (2-1).

Item 6. The liquid crystal composition according to item 2, wherein the second component is at least one compound selected from the group of compounds represented by formula (2-2).

Item 7. The liquid crystal composition according to item 4, wherein the fourth component is at least one compound selected from the group of compounds represented by formula (4-2).

Item 8. The liquid crystal composition according to any one of items 1 to 7, wherein a ratio of the first component is in the range of 10% by weight to 75% by weight, and a ratio of the second component is in the range of 10% by weight to 75% by weight, a ratio of the third component is in the range of 5% by weight to 70% by weight and a ratio of the fourth component is in the range of 10% by weight to 75% by weight based on the total weight of the liquid crystal composition.

Item 9. The liquid crystal composition according to any one of items 1 to 8, further containing at least one compound selected from the group of compounds represented by formula (5) as a fifth component:

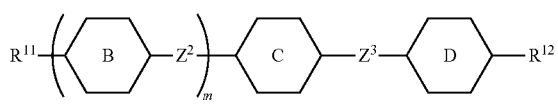
(5)

wherein $R^{11}$ and $R^{12}$ are independently alkyl having 1 to 12 carbons, alkoxy having 1 to 12 carbons, alkenyl having 2 to 12 carbons or alkenyl having 2 to 12 carbons in which hydrogen is replaced with fluorine; ring B, ring C or ring D are independently 1,4-cyclohexylene, 1,4-phenylene, 2-fluoro-1,4 phenylene, or 3-fluoro-1,4 phenylene; $Z^2$ and $Z^3$ are independently a single bond, ethylene, methyleneoxy or carbonyloxy; m is 0, 1 or 2 and at least one of ring C and ring D is 1,4-phenylene when m is 0.

Item 10. The liquid crystal composition according to item 9, wherein the fifth component is at least one compound selected from the group of compounds represented by formula (5-1) to formula (5-12):

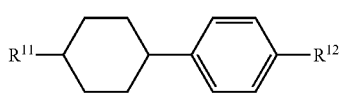
(5-1)

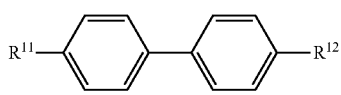
(5-2)

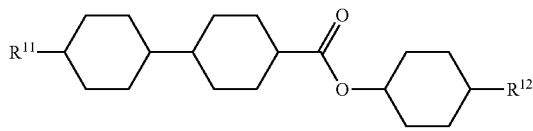
(5-3)

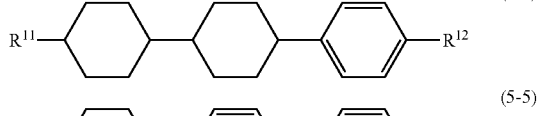
(5-4)

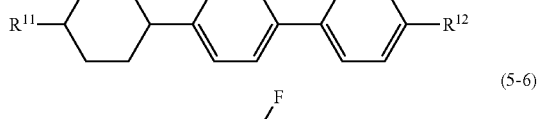
(5-5)

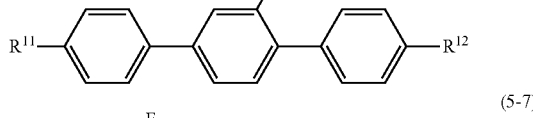
(5-6)

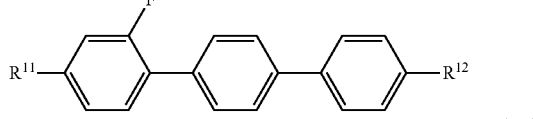
(5-7)

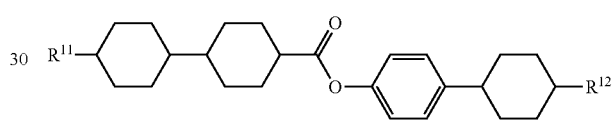
(5-8)

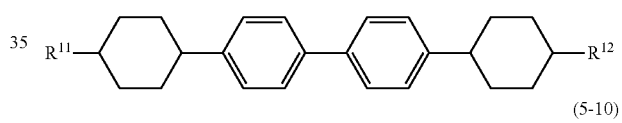
(5-9)

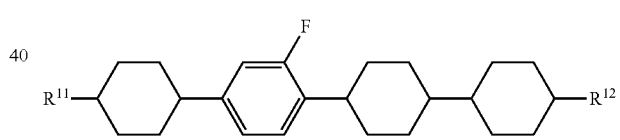
(5-10)

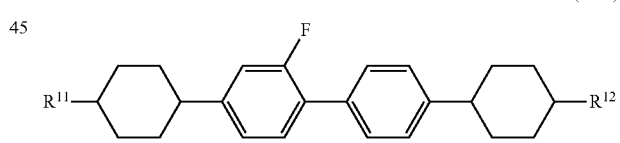
(5-11)

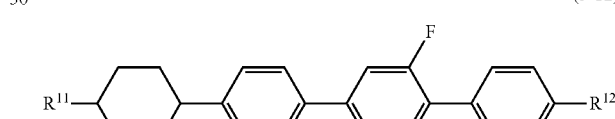
(5-12)

wherein $R^{11}$ and $R^{12}$ are independently alkyl having 1 to 12 carbons, alkoxy having 1 to 12 carbons, alkenyl having 2 to 12 carbons or alkenyl having 2 to 12 carbons in which hydrogen is replaced with fluorine.

Item 11. The liquid crystal composition according to item 10, wherein the fifth component is at least one compound selected from the group of compounds represented by formula (5-4).

Item 12. The liquid crystal composition according to item 10, wherein the fifth component is at least one compound selected from the group of compounds represented by formula (5-7).

Item 13. The liquid crystal composition according to any one of items 9 to 12, wherein a ratio of the fifth component is in the range of 5% by weight to 40% by weight based on the total weight of the liquid crystal composition.

Item 14. The liquid crystal composition according to any one of items 1 to 13, further containing at least one compound selected from the group of compounds represented by formula (6-1) or formula (6-2) as a sixth component:

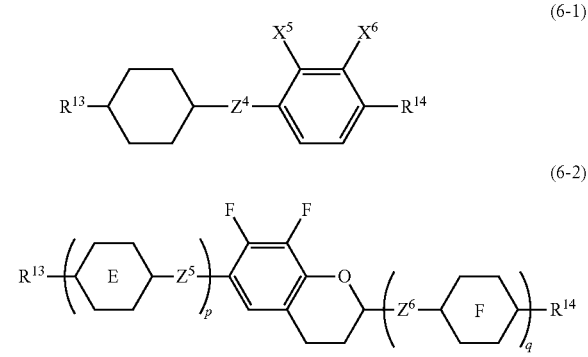

(6-1)

(6-2)

wherein $R^{13}$ and $R^{14}$ are independently alkyl having 1 to 12 carbons, alkoxy having 1 to 12 carbons or alkenyl having 2 to 12 carbons; ring E and ring F are independently 1,4-cyclohexylene or 1,4-phenylene; $Z^4$ is independently a single bond, ethylene or methyleneoxy; $Z^5$ and $Z^6$ are independently a single bond, ethylene, methyleneoxy or carbonyloxy; $X^5$ and $X^6$ are independently fluorine or chlorine; p is 0, 1 or 2, q is 0 or 1, and the sum of p and q is 1 or 2.

Item 15. The liquid crystal composition according to item 14, wherein the sixth component is at least one compound selected from the group of compounds represented by formula (6-1-1) to formula (6-1-3) and formula (6-2-1) to formula (6-2-5)

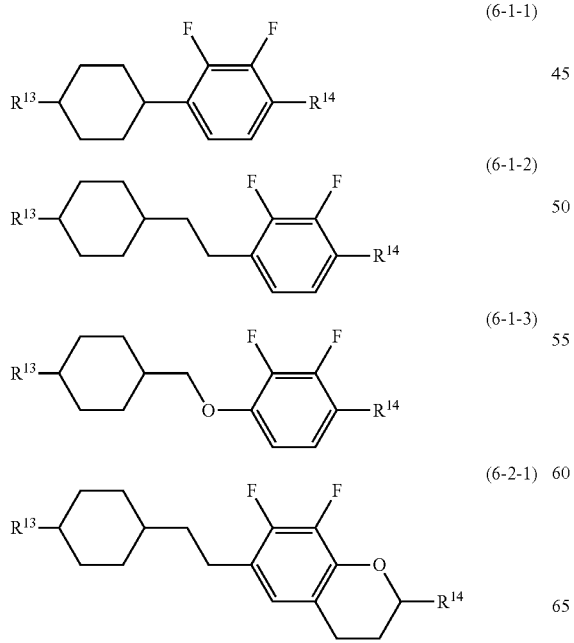

(6-1-1)

(6-1-2)

(6-1-3)

(6-2-1)

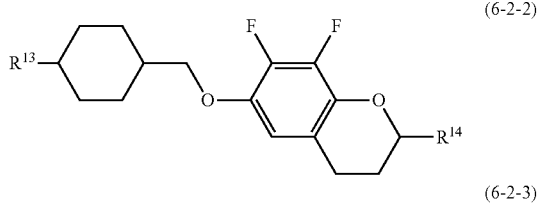

(6-2-2)

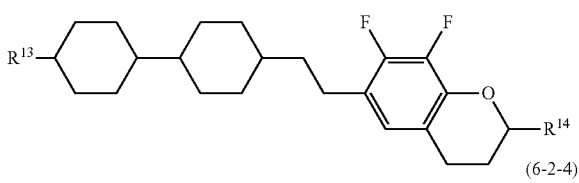

(6-2-3)

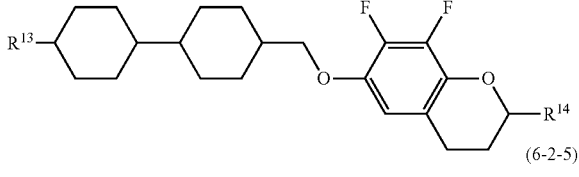

(6-2-4)

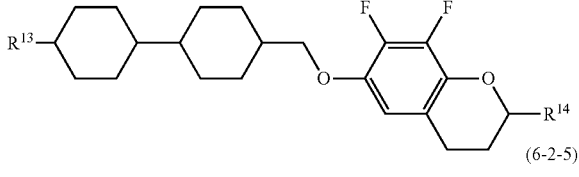

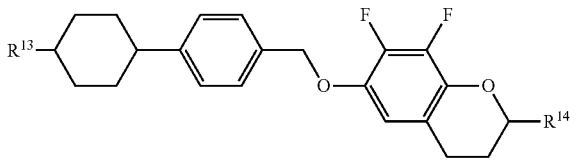

(6-2-5)

wherein $R^{13}$ and $R^{14}$ are independently alkyl having 1 to 12 carbons, alkoxy having 1 to 12 carbons or alkenyl having 2 to 12 carbons.

Item 16. The liquid crystal composition according to item 15, wherein the sixth component is at least one compound selected from the group of compounds represented by formula (6-1-1).

Item 17. The liquid crystal composition according to item 15, wherein the sixth component is at least one compound selected from the group of compounds represented by formula (6-2-4).

Item 18. The liquid crystal composition according to any one of items 14 to 17, wherein a ratio of the sixth component is in the range of 5% by weight to 40% by weight based on the total weight of the liquid crystal composition.

Item 19. The liquid crystal composition according to any one of items 1 to 18, wherein a maximum temperature of a nematic phase is 70° C. or higher, an optical anisotropy (25° C.) at a wavelength of 589 nanometers is 0.08 or more and a dielectric anisotropy (25° C.) at a frequency of 1 kHz is −2 or less.

Item 20. A liquid crystal display device, containing the liquid crystal composition according to any one of items 1 to 19.

Item 21. The liquid crystal display device according to item 20, wherein an operating mode in the liquid crystal display device is a VA mode, an IPS mode, an FFS mode or a PSA mode, and a driving mode in the liquid crystal display device is an active matrix mode.

The invention further includes the following items: (1) the composition, further containing the optically active compound; (2) the composition, further containing the additive such as an antioxidant, an ultraviolet light absorber or an antifoaming agent; (3) an AM device containing the composition; (4) a device containing the composition, and having a TN, ECB, OCB, IPS, FFS, VA or PSA mode; (5) a transmissive device, containing the composition; (6) use of the composition as the composition having the nematic phase; and (7) use of the composition as an optically active composition prepared by addition of the optically active compound to the composition.

The composition of the invention will be explained in the following order. First, a constitution of the component compounds in the composition will be explained. Second, main characteristics of the component compounds and main effects of the compounds on the composition will be explained. Third, a combination of components in the composition, a preferable ratio of the components and the basis thereof will be explained. Fourth, a preferable embodiment of the component compounds will be explained. Fifth, specific examples of the component compounds will be shown. Sixth, the additive that may be mixed with the composition will be explained. Seventh, methods for synthesizing the component compounds will be explained. Last, an application of the composition will be explained.

First, the constitution of the component compounds in the composition will be explained. The composition of the invention is classified into composition A and composition B. Composition A may further contain the other liquid crystal compound, the additive and the impurity and so forth. "The other liquid crystal compound" means a liquid crystal compound which is different from compound (1), compound (2), compound (3), compound (4) and compound (5), compound (6-1) and compound (6-2). Such a compound is mixed with the composition for the purpose of further adjusting the characteristics. Of any other liquid crystal compounds, a ratio of a cyano compound is preferably as small as possible in view of stability to heat or ultraviolet light. A further preferable ratio of the cyano compound is 0% by weight. The additive includes the optically active compound, the antioxidant, the ultraviolet light absorber, a coloring matter, the antifoaming agent, the polymerizable compound and a polymerization initiator. The impurity includes a compound mixed in a process such as preparation of the component compounds. Even in the case where the compound is liquid crystalline, the compound is classified as the impurity herein.

Composition B consists essentially of compounds selected from the group of compound (1), compound (2), compound (3), compound (4), compound (5), compound (6-1) and compound (6-2). A term "essentially" means that the composition does not contain any liquid crystal compound different from the compounds except the additive and the impurity. Composition B has a smaller number of components than composition A has. Composition B is preferable to composition A in view of cost reduction. Composition A is preferable to composition B in view of possibility of further adjusting physical properties by mixing any other liquid crystal compound.

Second, the main characteristics of the component compounds and the main effects of the compounds on the characteristics of the composition will be explained. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent a classification based on a qualitative comparison among the component compounds, and 0 (zero) means "a value is nearly zero."

TABLE 2

| | Characteristics of Compounds | | | | | |
|---|---|---|---|---|---|---|
| Compounds | Compound (1) | Compound (2) | Compound (3) | Compound (4) | Compound (5) | Compound (6-1) (6-2) |
| Maximum Temperature | M | M to L | M to L | M | S to L | M to L |
| Viscosity | M | M to L | M to L | S | S to M | M to L |
| Optical Anisotropy | L | M | M to L | S | M to L | M to L |
| Dielectric Anisotropy | L [1] | L [1] | L [1] | 0 | 0 | L [1] |
| Specific Resistance | L | L | L | L | L | L |

[1] A value of the dielectric anisotropy is negative, and the symbol shows magnitude of an absolute value.

Upon mixing the component compounds with the composition, the main effects of the component compounds on the characteristics of the composition are as described below. Compound (1) increases the maximum temperature, the absolute value of dielectric anisotropy and optical anisotropy. Compound (2) increases the absolute value of the dielectric anisotropy and decreases the minimum temperature. Compound (3) increases the optical anisotropy, the absolute value of the dielectric anisotropy and decreases the minimum temperature. Compound (4) decreases the viscosity, adjust into the suitable optical anisotropy and decreases the minimum temperature. Compound (5) decreases the viscosity and the minimum temperature. Compounds (6-1) and (6-2) increases the absolute value of dielectric anisotropy and decreases the minimum temperature.

Third, the combination of the components in the composition, the preferable ratio of the component compounds and the basis thereof will be explained. The combination of the components in the composition includes a combination of the first, the second component, the third and the fourth component, a combination of the first, the second, the third, the fourth and the fifth component, a combination of the first, the second, the third, the fourth and the sixth, and a combination of the first, the second, the third, the fourth, the fifth and the sixth component.

A preferable combination of the components in the composition is a combination of the first, the second, the third, the fourth and the fifth component for increasing the maximum temperature or decreasing the viscosity, and is the combination of the first, the second, the third, the fourth, the fifth and the sixth component for increasing the absolute value of the dielectric anisotropy, decreasing the viscosity or the minimum temperature.

A preferable ratio of the first component is about 10% by weight or more for increasing the absolute value of the optical anisotropy and dielectric anisotropy, and is about 75% by weight or less for decreasing the minimum temperature. A further preferable ratio is in the range of about 12% by weight to about 50% by weight. A particularly preferable ratio is in the range of about 15% by weight to about 30% by weight.

A preferable ratio of the second component is about 10% by weight or more for increasing the absolute value of the dielectric anisotropy, and is 75% or less for decreasing the viscosity. A further preferable ratio is in the range of about 15% by weight to about 60% by weight. A particularly preferable ratio is in the range of about 20% by weight to about 45% by weight.

A preferable ratio of the third component is about 5% by weight or more for increasing the absolute value of the dielectric anisotropy, and is about 70% or less for decreasing the minimum temperature. A further preferable ratio is in the range of about 10% by weight to about 60% by weight. A particularly preferable ratio is in the range of about 20% by weight to about 50% by weight.

A preferable ratio of the fourth component is about 10% by weight or more for decreasing the viscosity, and is 75% by weight for decreasing the minimum temperature. A further preferable ratio is in the range of about 15% by weight to about 65% by weight. A particularly preferable ratio is in the range of about 20% by weight to about 60% by weight.

A preferable ratio of the fifth component is about 5% by weight or more for decreasing the viscosity, and is 40% by weight or less for decreasing the minimum temperature. A further preferable ratio is in the range of about 10% by weight to about 35% by weight. A particularly preferable ratio is in the range of about 15% by weight to about 30% by weight.

A preferable ratio of the sixth component is about 5% by weight or more for increasing the absolute value of the dielectric anisotropy, decreasing the viscosity, and is 40% by weight or less for decreasing the minimum temperature. A further preferable ratio is in the range of about 10% by weight to about 30% by A particularly preferable ratio is in the range of about 15% by weight to about 25% by weight.

Fourth, the preferable embodiment of the component compounds will be explained.

$R^1$, $R^2$, $R^3$, $R^4$, $R^5$, $R^6$, $R^{13}$ and $R^{14}$ are independently alkyl having 1 to 12 carbons, alkoxy having 1 to 12 carbons, or alkenyl having 2 to 12 carbons, and $R^{11}$ and $R^{12}$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine, $R^6$ is alkyl having 1 to 12 carbons, alkoxy having 1 to 12 carbons, vinyl, or vinyl in which arbitrary hydrogen is replaced with fluorine, $R^7$, $R^9$ and $R^{10}$ are independently alkyl having 1 to 12 carbons or alkoxy having 1 to 12 carbons.

Preferable $R^1$, $R^2$, $R^3$, $R^4$, $R^5$, $R^6$, $R^{13}$ or $R^{14}$ is alkyl having 1 to 12 carbons or alkenyl having 2 to 12 carbons for decreasing the minimum temperature or decreasing the viscosity. Further preferable $R^2$, $R^4$, $R^6$ or $R^{14}$ is alkoxy having 1 to 12 carbons for increasing the absolute value of the dielectric anisotropy. Preferable $R^{11}$ or $R^{12}$ is alkenyl having 2 to 12 carbons for decreasing the minimum temperature or decreasing the viscosity, and is alkyl having 1 to 12 carbons for increasing the stability to ultraviolet light or heat, or the like. Preferable $R^8$ is vinyl for decreasing the viscosity, and is alkyl having 1 to 12 carbons for increasing the stability to ultraviolet light or heat. Preferable $R^7$, $R^9$ or $R^{10}$ is alkyl having 1 to 12 carbons for increasing the maximum temperature.

Preferable alkyl is methyl, ethyl, propyl, butyl, pentyl, hexyl, heptyl or octyl. Further preferable alkyl is ethyl, propyl, butyl, pentyl or heptyl for decreasing the viscosity.

Preferable alkoxy is methoxy, ethoxy, propoxy, butoxy, pentyloxy, hexyloxy or heptyloxy. Further preferable alkoxy is methoxy or ethoxy for decreasing the viscosity.

Preferable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferable alkenyl is vinyl, 1-propenyl, 3-butenyl or 3-pentenyl for decreasing the viscosity. A preferable configuration of —CH=CH— in the alkenyl depends on a position of a double bond. Trans is preferable in the alkenyl such as 1-propenyl, 1-butenyl, 1-pentenyl, 1-hexenyl, 3-pentenyl and 3-hexenyl for decreasing the viscosity. Cis preferable in the alkenyl such as 2-butenyl, 2-pentenyl and 2-hexenyl. In the alkenyl, straight-chain alkenyl is preferable to branched-chain alkenyl.

Preferable examples of alkenyl in which arbitrary hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferable examples include 2,2-difluorovinyl and 4,4-difluoro-3-butenyl for decreasing the viscosity.

Alkyl doesn't include circular alkyl. Alkoxy doesn't include circular alkoxy. Alkenyl doesn't include circular alkenyl.

Then, m is 0, 1 or 2. Preferable m is 1 or 2 for increasing the maximum temperature, and is 0 for decreasing the viscosity. Then, p is 0, 1 or 2, q is 0 or 1, and the sum of p and q is 1 or 2. Preferable p is 2 for increasing the maximum temperature, and is 1 for decreasing the viscosity. Preferable q is 1 for increasing the maximum temperature, and is 0 for decreasing the minimum temperature.

Ring A is 1,4-cyclohexylene or 1,4-phenylene, and preferable ring A is 1,4-cyclohexylene for increasing the maximum temperature, and is 1,4-phenylene for increasing the optical anisotropy. Ring B, ring C and ring D are independently 1,4-cyclohexylene, 1,4-phenylene, 2-fluoro-1,4-phenylene or 3-fluoro-1,4-phenylene. When m is 0 at least one of ring C and ring D is 1,4-phenylene. When m is 2 arbitrary two rings B may be identical or different. Preferable ring B, ring C, or ring D is 1,4-cyclohexylene for increasing the maximum temperature and 1,4-phenylene for increasing the optical anisotropy. Ring E and ring F are independently 1,4-cyclohexylene or 1,4-phenylene, and when p is 2 two of arbitrary ring E may be identical or different. Preferable ring E is 1,4-cyclohexylene for increasing the maximum temperature or is 1,4-phenylene for decreasing the minimum temperature. Preferable ring F is 1,4-cyclohexylene for increasing the maximum temperature.

$X^1$, $X^2$, $X^3$, $X^4$, $X^5$ and $X^6$ are independently fluorine or chlorine. Preferable $X^1$, $X^2$, $X^3$, $X^4$, $X^5$ or $X^6$ is fluorine for decreasing the viscosity.

$Y^1$ is hydrogen or methyl. Preferable $Y^1$ is hydrogen for decreasing the viscosity, and is methyl for increasing stability to ultraviolet light, heat or the like.

$Z^1$ is a single bond or ethylene. Preferable $Z^1$ is a single bond for decreasing the viscosity and ethylene for decreasing the minimum temperature. $Z^2$, $Z^3$, $Z^5$ and $Z^6$ area single bond, ethylene, methyleneoxy or carbonyloxy, two of $Z^2$ may be identical or different when m is 2, and two of $Z^5$ may be identical or different when p is 2. Preferable $Z^2$, $Z^3$, $Z^5$ or $Z^6$ is a single bond for decreasing the viscosity, and is methyleneoxy or carbonyloxy for increasing the dielectric anisotropy. $Z^4$ is a single bond, ethylene or methyleneoxy. Preferable $Z^4$ is ethylene for decreasing the minimum temperature, and is methyleneoxy for increasing the dielectric anisotropy.

Fifth, the specific examples of the component compounds will be shown.

In the preferable compounds described below, $R^{15}$ is independently straight chained alkyl having 1 to 12 carbons, and straight chained alkenyl having 2 to 12 carbons, $R^{16}$ is independently straight chained alkyl having 1 to 12 carbons, $R^{17}$ is independently straight chained alkyl having 1 to 12 carbons, straight chained alkoxy having 1 to 12 carbons or straight chained alkenyl having 2 to 12 carbons, $R^{18}$ is independently straight chained alkyl having 1 to 12 carbons or straight chained alkoxy having 1 to 12 carbons, $R^{19}$ is independently straight chained alkyl having 1 to 12 carbons or straight chained alkoxy having 1 to 12 carbons, straight chained alkenyl having 2 to 12 carbons or straight chained alkenyl having 2 to 12 carbons in which arbitrary hydrogen is replaced by fluorine. With regard to a configuration of 1,4-cyclohexylene in the compounds, trans is preferable to cis for increasing the maximum temperature.

Preferable compound (1) is compound (1-1). Preferable compound (2) includes compound (2-1-1) and compound (2-2-1). Further preferable compound (2) includes compound (2-1-1). Preferable compound (3) includes compound (3-1-1). Preferable compound (4) includes compound (4-1-1) and compound (4-2-1). Further preferable compound (4) includes compound (4-2-1). Preferable compound (5) includes compound (5-1-1) to (5-12-1). Further preferable compound (5) is compound (5-7-1). Preferable compound (6-1) includes (6-1-1-1) to (6-1-3-1). Further preferable (6-1) includes (6-1-1-1) and (6-1-3-1). Preferable compound (6-2) includes compound (6-2-1-1) to (6-2-5-1). Further preferable compound (6-2) is compound (6-2-4-1).
(1-1)
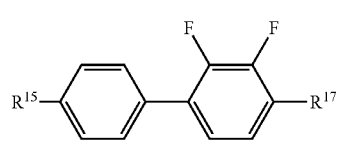
(2-1-1)
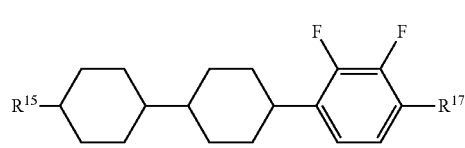
(2-2-1)
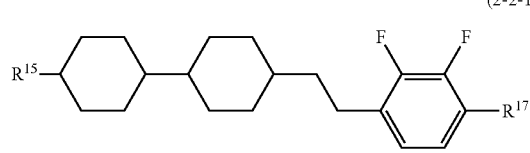
(3-1-1)
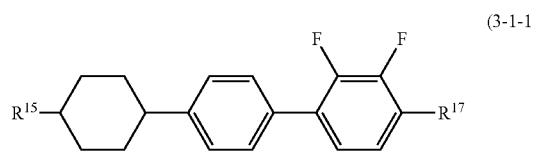
(4-1-1)
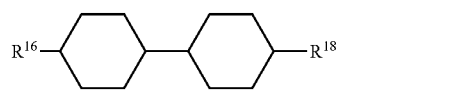
(4-2-1)
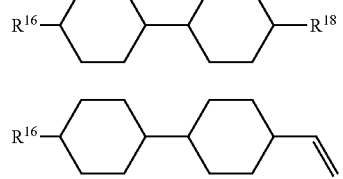
(5-1-1)
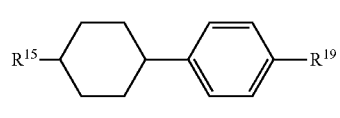
(5-2-1)
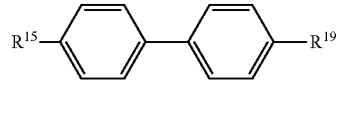
(5-3-1)
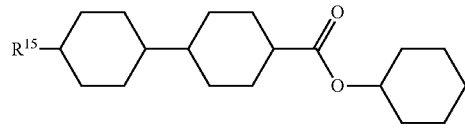
(5-4-1)
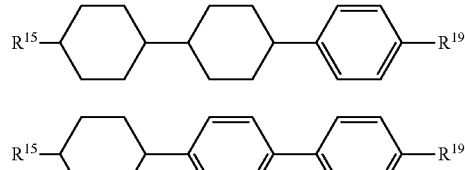
(5-5-1)
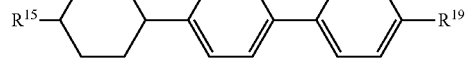
-continued
(5-6-1)
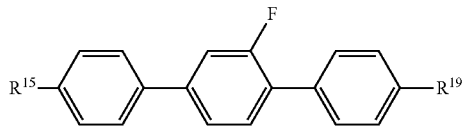
(5-7-1)
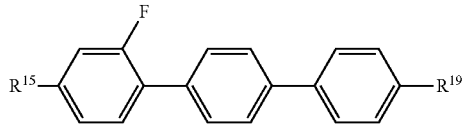
(5-8-1)
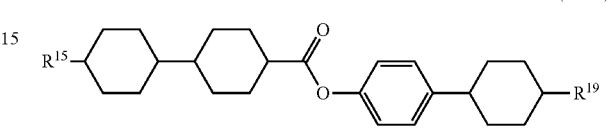
(5-9-1)
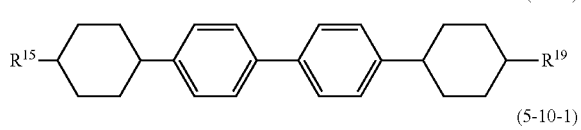
(5-10-1)
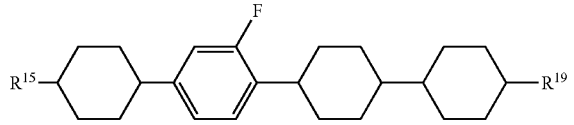
(5-11-1)
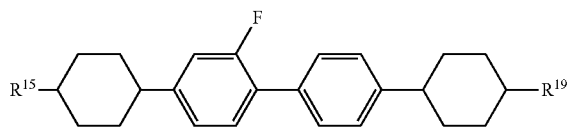
(5-12-1)
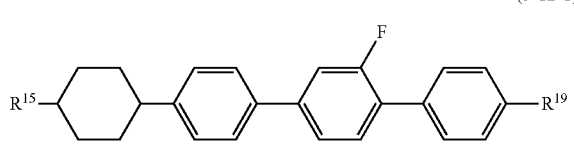
(6-1-1-1)
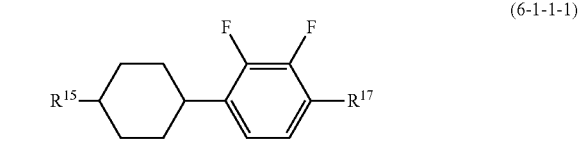
(6-1-2-1)
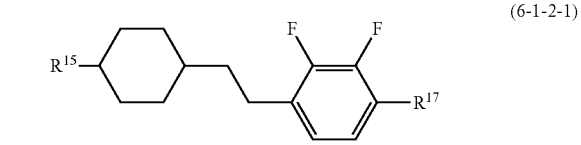
(6-1-3-1)
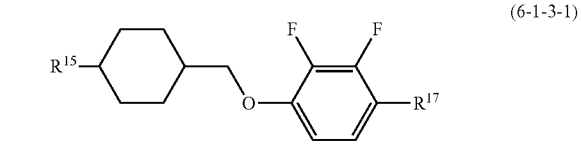
(6-2-1-1)
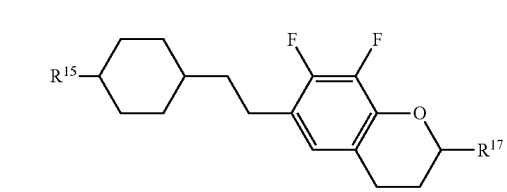

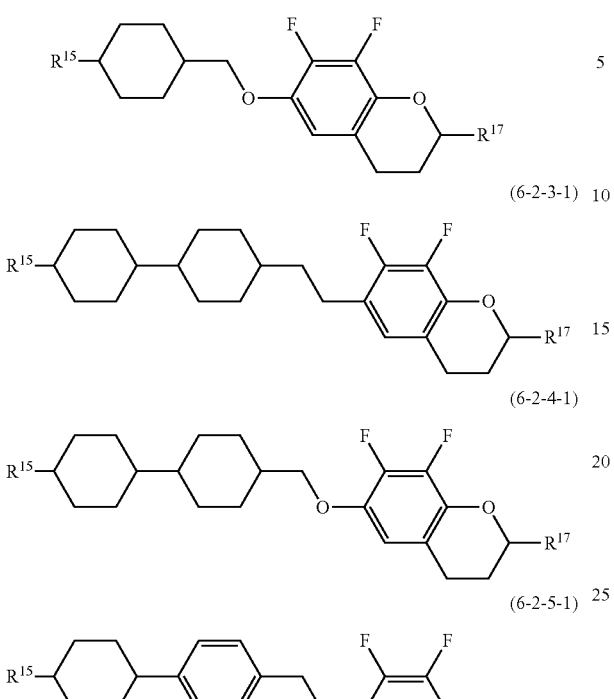

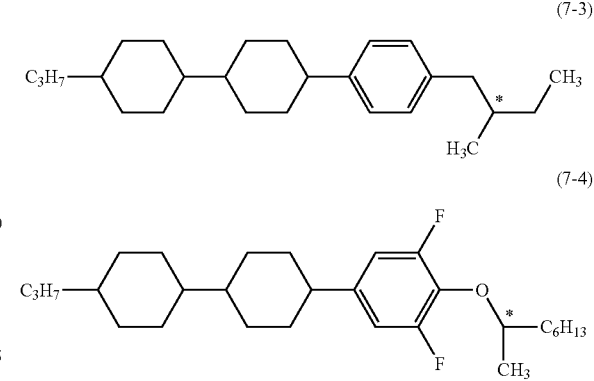

Sixth, the additive that may be mixed with the composition will be explained. Such an additive includes the optically active compound, the antioxidant, the ultraviolet light absorber, the coloring matter, the antifoaming agent, the polymerizable compound and the polymerization initiator. The optically active compound is mixed with the composition for the purpose of inducing a helical structure and giving a twist angle in liquid crystals. Examples of such a compound include compound (7-1) to compound (7-4). A preferable ratio of the optically active compound is about 5% by weight or less. A further preferable ratio is in the range of about 0.01% by weight to about 2% by weight.

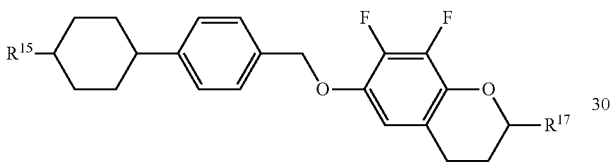

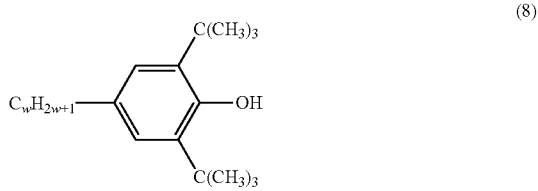

The antioxidant is mixed with the composition for the purpose of preventing a decrease in specific resistance caused by heating in air, or maintaining a large voltage holding ratio at room temperature and also at a temperature close to the maximum temperature of the nematic phase after the device was used for a long time.

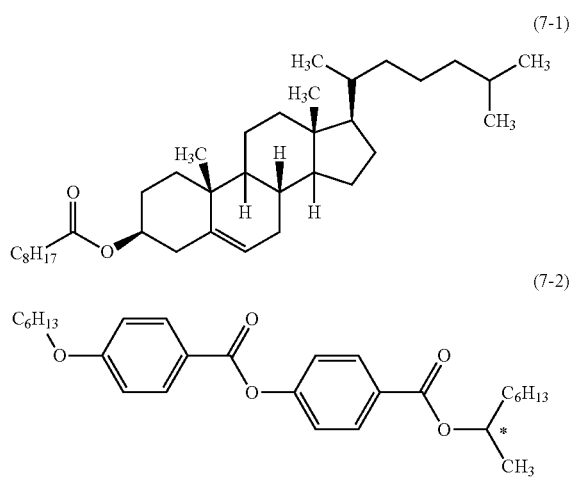

Preferable examples of the antioxidant include compound (8) where w is an integer from 1 to 9. In compound (8), preferable w is 1, 3, 5, 7 or 9. Further preferable w is 1 or 7. Compound (8) where w is 1 is effective in preventing a decrease in specific resistance caused by heating in air because the compound (8) has a large volatility. Compound (8) where w is 7 is effective in maintaining a large voltage holding ratio at room temperature and also at a temperature close to the maximum temperature of the nematic phase after the device was used for a long time because the compound (8) has a small volatility. A preferable ratio of the antioxidant is about 50 ppm or more for achieving the effect thereof, and about 600 ppm or less for avoiding a decrease in maximum temperature or avoiding an increase in minimum temperature. A further preferable ratio is in the range of about 100 ppm to about 300 ppm.

Preferable examples of the ultraviolet light absorber include a benzophenone derivative, a benzoate derivative and a triazole derivative. A light stabilizer such as an amine having steric hindrance is also preferable. A preferable ratio of the absorber or the stabilizer is about 50 ppm or more for achieving the effect thereof, and about 10,000 ppm or less for avoiding a decrease in maximum temperature or avoiding an increase in minimum temperature. A further preferable ratio is in the range of about 100 ppm to about 10,000 ppm.

A dichroic dye such as an azo dye or an anthraquinone dye is mixed with the composition to be adapted for a device having a guest host (GH) mode. A preferable ratio of the dye is in the range of about 0.01% by weight to about 10% by weight. The antifoaming agent such as dimethyl silicone oil or methyl phenyl silicone oil is mixed with the composition for preventing foam formation. A preferable ratio of the antifoaming agent is about 1 ppm or more for achieving the effect thereof, and about 1,000 ppm or less for avoiding a poor display. A further preferable ratio is in the range of about 1 ppm to about 500 ppm.

The polymerizable compound is mixed with the composition to be adapted for the device having the polymer sustained alignment (PSA) mode. Preferable examples of the polymerizable compound include a compound having a polymerizable group such as acrylate, methacrylate, vinyl, vinyloxy, propenyl ether, epoxy (oxirane, oxetane) and vinyl ketone. Particularly preferable examples include an acrylate derivative or a methacrylate derivative. A preferable ratio of the polymerizable compound is about 0.05% by weight or more for achieving the effect thereof, and about 10% by weight or less for avoiding a poor display. A further preferable ratio is in the range of about 0.1% by weight to about 2% by weight. The polymerizable compound is preferably polymerized by irradiation with ultraviolet light or the like in the presence of a suitable initiator such as a photo polymerization initiator. Suitable conditions for polymerization, suitable types of the initiator and suitable amounts thereof are known to a person skilled in the art and are described in literatures. For example, Irgacure 651 (registered trademark), Irgacure 184 (registered trademark) or Darocure 1173 (registered trademark) (BASF), each being a photoinitiator, is suitable for radical polymerization. A preferable ratio of the photo polymerization initiator is in the range of about 0.1% by weight to about 5% by weight of the polymerizable compound, and a particularly preferable ratio is in the range of about 1% by weight to about 3% by weight.

Seventh, the methods for synthesizing the component compounds will be explained. The compounds can be prepared according to known methods. Examples of synthetic methods are shown. Compound (1-1) is prepared by the method described in JP H2-503430 A. Compound (2-1-1) is prepared by the method described in JP H2-503441A. Compound (3-1-1) is prepared by the method described in JP S57-114532 A. Compound (4-1-1) is prepared by the method described in JP S59-70624 A. Compound (5-1-1) is prepared by the method described in JP S56-68636A. Compound (6-2-4-1) is prepared by the method described in JP 2005-290349A. The antioxidant is commercially available. A compound represented by formula (8) where w is 1 is available from Sigma-Aldrich Corporation. Compound (8) where w is 7 and so forth are prepared according to the method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be explained. Most of the compositions have a minimum temperature of about −10° C. or lower, a maximum temperature of about 70° C. or higher, and an optical anisotropy in the range of about 0.07 to about 0.20. The device containing the composition has a large voltage holding ratio. The composition is suitable for use in the AM device. The composition is particularly suitable for use in a trans missive AM device. The composition having an optical anisotropy in the range of about 0.08 to about 0.25 may be prepared by controlling the ratio of the component compounds or by mixing any other liquid crystal compound. The composition can be used as the composition having the nematic phase and as the optically active composition by adding the optically active compound.

The composition can be used for the AM device, and also for a PM device. The composition can also be used for an AM device and a PM device having a mode such as PC, TN, STN, ECB, OCB, IPS, FFS, VA or PSA. Use for the AM device having the IPS or VA mode is particularly preferable. The device may be of a reflective type, a transmissive type or a transreflective type. Use for the transmissive device is preferable. The composition can also be used for an amorphous silicon-TFT device or a polycrystal silicon-TFT device. The composition can also be used for a nematic curvilinear aligned phase (NCAP) device prepared by microencapsulating the composition, and for a polymer dispersed (PD) device in which a three-dimensional network-polymer is formed in the composition.

EXAMPLES

In order to evaluate a composition and a compound to be contained in the composition, the composition and the compound were made a measurement object. When the measurement object was the composition, the measurement object was measured as is, and values obtained were described. When the measurement object was the compound, a sample for measurement was prepared by mixing the compound (15% by weight) into mother liquid crystals (85% by weight). Values of characteristics of the compound were calculated according to an extrapolation method using values obtained by measurement: (extrapolated value)={(measured value of a sample for measurement)−0.85×(measured value of mother liquid crystals)}/0.15. When a smectic phase (or crystals) precipitated at the above ratio at 25° C., a ratio of the compound to the mother liquid crystals was changed step by step in the order of (10% by weight:90% by weight), (5% by weight:95% by weight) and (1% by weight:99% by weight). Values of a maximum temperature, an optical anisotropy, viscosity and a dielectric anisotropy with regard to the compound were obtained according to the extrapolation method.

The composition of the mother liquid crystals were as described below.

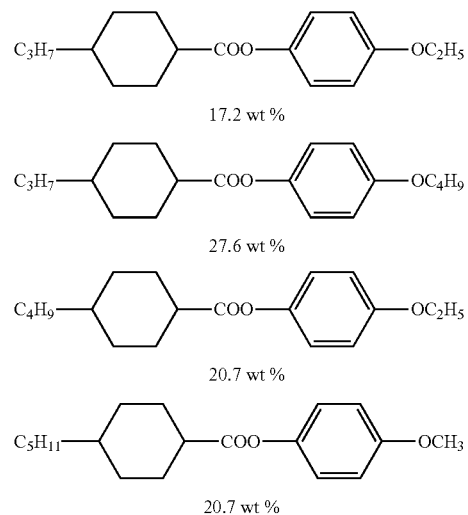

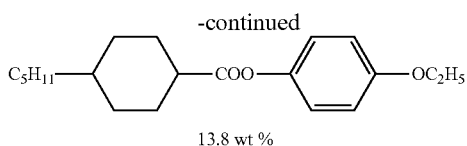

13.8 wt %

Characteristics were measured according to the methods described below. Most of the methods are applied as described in JEITA ED-25213 of Japan Electronics and Information Technology Industries Association, or as modified thereon.

Maximum Temperature of a Nematic Phase (NI; ° C.): A sample was placed on a hot plate in a melting point apparatus equipped with a polarizing microscope and was heated at a rate of 1° C. per minute. Temperature when a part of the sample began to change from a nematic phase to an isotropic liquid was measured. A higher limit of a temperature range of the nematic phase may be abbreviated as "maximum temperature."

Minimum Temperature of a Nematic Phase ($T_c$; ° C.): A sample having a nematic phase was put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c$≤−20° C. A lower limit of a temperature range of the nematic phase may be abbreviated as "minimum temperature."

Viscosity (bulk viscosity; η; measured at 20° C.; mPa·s): A cone-plate (E type) viscometer was used for measurement.

Optical Anisotropy (refractive index anisotropy; Δn; measured at 25° C.): Measurement was carried out by means of an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy was calculated from an equation: Δn=n∥−n⊥.

Dielectric Anisotropy (Δ∈; measured at 25° C.): A value of dielectric anisotropy was calculated from an equation: Δ∈= ∈∥−∈⊥. A dielectric constant (∈∥ and ∈⊥) was measured as described below.

1) Measurement of dielectric constant (∈∥): An ethanol (20 mL) solution of octadecyl triethoxysilane (0.16 mL) was applied to a well-washed glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant (∈∥) in the major axis direction of liquid crystal molecules was measured.

2) Measurement of dielectric constant (∈⊥): A polyimide solution was applied to a well-washed glass substrate. After calcining the glass substrate, rubbing treatment was applied to the alignment film obtained. A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant (∈⊥) in the minor axis direction of the liquid crystal molecules was measured.

Threshold Voltage (Vth; measured at 25° C.; V): An LCD-5100 luminance meter made by Otsuka Electronics Co., Ltd. was used for measurement. A light source was a halogen lamp. A sample was put in a VA device having a normally black mode, in which a distance (cell gap) between two glass substrates was 4 micrometers and a rubbing direction was anti-parallel, and the device was sealed with an ultraviolet-curable adhesive. Voltage (60 Hz, rectangular waves) to be applied to the device was increased stepwise from 0 V to 20 V at an increment of 0.02 V. On the occasion, the device was irradiated with light from a direction perpendicular to the device, and the amount of light passing through the device was measured. A voltage-transmittance curve was prepared, in which the maximum amount of light corresponds to 100% transmittance and the minimum amount of light corresponds to 0% transmittance. A threshold voltage is voltage at 10% transmittance.

Voltage Holding Ratio (VHR-1; at 25° C.; %): A TN device used for measurement had a polyimide alignment film, and a distance (cell gap) between two glass substrates was 5 micrometers. A sample was put in the device, and then the device was sealed with an ultraviolet-polymerizable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was obtained. Area B is an area without decay. A voltage holding ratio is a percentage of area A to area B.

Voltage Holding Ratio (VHR-2; at 80° C.; %): A TN device used for measurement had a polyimide alignment film, and a distance (cell gap) between two glass substrates was 5 micrometers. A sample was put in the device, and then the device was sealed with an ultraviolet-polymerizable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was obtained. Area B is an area without decay. A voltage holding ratio is a percentage of area A to area B.

Voltage Holding Ratio (VHR-3; at 25° C.; %): Stability to ultraviolet light was evaluated by measuring a voltage holding ratio after a device was irradiated with ultraviolet light. A TN device used for measurement had a polyimide alignment film and a cell gap was 5 micrometers. A sample was injected into the device, and then the device was irradiated with light for 20 minutes. A light source was an ultra high-pressure mercury lamp USH-500D (made by Ushio, Inc.), and a distance between the device and the light source was 20 centimeters. In measuring VHR-3, a decaying voltage was measured for 16.7 milliseconds. A composition having a large VHR-3 has a high stability to ultraviolet light. A value of VHR-3 is preferably in the range of 90% or more, further preferably, 95% or more.

Voltage Holding Ratio (VHR-4; at 25° C.; %): A TN device into which a sample was injected was heated in a constant-temperature bath at 80° C. for 500 hours, and then stability to heat was evaluated by measuring a voltage holding ratio. In measuring VHR-4, a decaying voltage was measured for 16.7 milliseconds. A composition having a large VHR-4 has a high stability to heat.

Response Time (τ; measured at 25° C.; ms): An LCD-5100 luminance meter made by Otsuka Electronics Co., Ltd. was used for measurement. A light source was a halogen lamp. A low-pass filter was set at 5 kHz. A sample was put in a VA device having a normally black mode, in which a distance (cell gap) between two glass substrates was 4 micrometers and a rubbing direction was anti-parallel, and the device was sealed with an ultraviolet-curable adhesive. Rectangular waves (60 Hz, 10 V, 0.5 second) were applied to the device. On the occasion, the device was irradiated with light from a direction perpendicular to the device, and the amount of light passing through the device was measured. The maximum amount of light corresponds to 100% transmittance, and the minimum amount of light corresponds to 0% transmittance. A response time is time required for a change from 90% transmittance to 10% transmittance (fall time; millisecond).

Specific Resistance ($\rho$; measured at 25° C.; $\Omega$cm): Into a vessel equipped with an electrode, 1.0 milliliter of a sample was injected. A DC voltage (10 V) was applied to the vessel, and a DC current after 10 seconds was measured. A specific resistance was calculated from the following equation:

(specific resistance)={(voltage)×(electric capacity of vessel)}/{(DC current)×(dielectric constant of vacuum)}.

Gas Chromatographic Analysis: GC-14B gas chromatograph made by Shimadzu Corporation was used for measurement. A carrier gas was helium (2 mL per minute). A sample injector and a detector (FID) were set to 280° C. and 300° C., respectively. A capillary column DB-1 (length 30 m, bore 0.32 mm, film thickness 0.25 µm; dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample injector. A recorder was C-R5A Chromatopac made by Shimadzu Corporation or the equivalent thereof. The resulting gas chromatogram showed a retention time of a peak and a peak area corresponding to each of the component compounds.

As a solvent for diluting a sample, chloroform, hexane and so forth may also be used. The following capillary columns may also be used for separating the component compounds: HP-1 (length 30 m, bore 0.32 mm, film thickness 0.25 µm) made by Agilent Technologies, Inc., Rtx-1 (length 30 m, bore 0.32 mm, film thickness 0.25 µm) made by Restek Corporation and BP-1 (length 30 m, bore 0.32 mm, film thickness 0.25 µm) made by SGE International Pty. Ltd. A capillary column CBP1-M50-025 (length 50 m, bore 0.25 mm, film thickness 0.25 µm) made by Shimadzu Corporation may also be used for the purpose of avoiding an overlap of peaks of the compounds.

A ratio of liquid crystal compounds included in a composition may be calculated by the method as described below. The liquid crystal compounds can be detected by means of a gas chromatograph. A ratio of peak areas in a gas chromatogram corresponds to a ratio (in the number of moles) of the liquid crystal compounds. When the capillary columns described above were used, a correction coefficient of each of the liquid crystal compounds may be regarded as 1 (one). Accordingly, a ratio (% by weight) of the liquid crystal compounds was calculated from the ratio of the peak areas.

The invention will be explained in detail by way of Examples. The invention is not limited by the Examples described below. The compounds described in Comparative Examples and Examples were expressed using symbols according to definitions in Table 3 below. In Table 3, a configuration of 1,4-cyclohexylene is trans. A parenthesized number next to the symbols in Examples corresponds to the number of a preferable compound. A symbol (-) means any other liquid crystal compound. A ratio (percentage) of liquid crystal compounds is represented in terms of weight percent (% by weight) based on the total weight of the liquid crystal composition. The liquid crystal composition further includes an impurity. Last, values of characteristics of the composition were summarized.

TABLE 3

Method for Description of Compounds using Symbols
R—(A$_1$)—Z$_1$—...—Z$_n$—(A$_n$)—R'

| 1) Left-terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |

| 2) Right-terminal Group —R' Symbol | Symbol |
|---|---|
| —$C_nH_{2n+1}$ | -n |
| —$OC_nH_{2n+1}$ | —On |
| —CH=CH$_2$ | —V |
| —CH=CH—$C_nH_{2n+1}$ | —Vn |
| —$C_nH_{2n}$—CH=CH$_2$ | —nV |
| —CH=CF$_2$ | —VFF |
| —$OC_nH_{2n}$—CH=CH$_2$ | —OnV |

| 3) Bonding Group —Z$_n$— | Symbol |
|---|---|
| —$OC_nH_{2n}O$— | OnO |
| —$C_nH_{2n}$— | n |
| —COO— | E |
| —CH=CH— | V |
| —CH$_2$O— | 1O |
| —OCH$_2$— | O1 |
| —SiH$_2$— | Si |

| 4) Ring Structure —A$_n$ | Symbol |
|---|---|
| 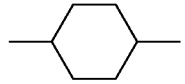 | H |
| 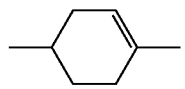 | Ch |
| 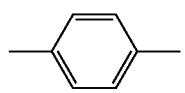 | B |
| 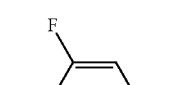 | B(2F) |
| 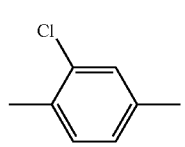 | B(2CL) |

TABLE 3-continued

Method for Description of Compounds using Symbols
R—(A₁)—Z₁— ... —Zₙ—(Aₙ)—R'

| Structure | Symbol |
|---|---|
| (1,4-phenylene with 1F) | B(F) |
| (1,4-phenylene with 2F, 3F) | B(2F, 3F) |
| (1,4-phenylene with 2F, 3Cl) | B(2F, 3CL) |
| (1,4-phenylene with 2Cl, 3F) | B(2CL, 3F) |
| (1,4-phenylene with 3F, 6F) | B(3F, 6F) |
| (1,4-phenylene with 2F, 3F, 6Me) | B(2F, 3F, 6Me) |
| (tetrahydropyran, 2,5-linked) | dh |
| (tetrahydropyran, 2,5-linked alternate) | Dh |
| (chromane with 7F, 8F) | Cro(7F, 8F) |

5) Examples of Description

Example 1 3-BB(2F, 3F)—O2

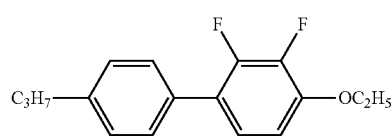

Example 2 3-HHB(2F, 3F)—O2

C₃H₇—[cyclohexyl]—[cyclohexyl]—[phenyl-2F,3F]—OC₂H₅

Example 3 5-HBB(F)B-3

C₅H₁₁—[cyclohexyl]—[phenyl]—[phenyl-F]—[phenyl]—C₃H₇

Example 4 3-HBB(2F, 3F)—O2

C₃H₇—[cyclohexyl]—[phenyl]—[phenyl-2F,3F]—OC₂H₅

Comparative Example 1

From the compositions disclosed in WO 2008/285570A, Composition Example 3 was selected. The basis of selection is that the composition comprises of the compositions which are similar to compound (1), compound (2), compound (3), compound (4), compound (5), and compound (6-1). Components and characteristics of the composition were as described below.

| Compound | Formula | % |
|---|---|---|
| 3-BB(2F,3F)-O2 | (1-1) | 10% |
| V2-BB(2F,3F)-O2 | (1-1) | 5% |
| 3-HHB(2F,3F)-O2 | (2-1-1) | 7% |
| 5-HHB(2F,3F)-O2 | (2-1-1) | 7% |
| 3-HH2B(2F,3F)-O2 | (2-2-1) | 6% |
| V-HBB(2F,3F)-O2 | (3-1-1) | 5% |
| 3-HVH-1 | Similar(4) | 7% |
| 3-HVH-2 | Similar(4) | 7% |
| 3-HHB-1 | (5-4-1) | 5% |
| V-HHB-1 | (5-4-1) | 5% |
| 5-HBB(F)B-3 | (5-12-1) | 5% |
| 3-HB(2F,3F)-O2 | (6-1-1-1) | 10% |
| 5-HB(2F,3F)-O2 | (6-1-1-1) | 10% |
| 3-HVHH-2 | (—) | 3% |
| V-HVHB-1 | (—) | 8% |

NI = 90.6° C.; Tc ≤ −20° C.; Δn = 0.109; η = 21.9 mPa · s; Δε = −3.0.

Example 1

The compound similar to the compound (4) of Comparative Example 1 was replaced with compound (4-2-1). The components and characteristics were as described below. Example (1) has a higher maximum temperature, a larger optical anisotropy and a smaller viscosity than Comparative Example (1).

| Compound | Formula | % |
|---|---|---|
| 3-BB(2F,3F)-O2 | (1-1) | 10% |
| V2-BB(2F,3F)-O2 | (1-1) | 5% |

-continued

| | | |
|---|---|---|
| 3-HHB(2F,3F)-O2 | (2-1-1) | 7% |
| 5-HHB(2F,3F)-O2 | (2-1-1) | 7% |
| 3-HH2B(2F,3F)-O2 | (2-2-1) | 6% |
| V-HBB(2F,3F)-O2 | (3-1-1) | 5% |
| 3-HH-V | (4-2-1) | 14% |
| 3-HHB-1 | (5-4-1) | 5% |
| V-HHB-1 | (5-4-1) | 5% |
| 5-HBB(F)B-3 | (5-12-1) | 5% |
| 3-HB(2F,3F)-O2 | (6-1-1-1) | 10% |
| 5-HB(2F,3F)-O2 | (6-1-1-1) | 10% |
| 3-HVHH-2 | (—) | 3% |
| V-HVHB-1 | (—) | 8% |

NI = 92.5° C.;
Tc ≤ −20° C.;
Δn = 0.112;
η = 17.5 mPa · s;
Δε = −3.1;
VHR-1 = 99.1%;
VHR-2 = 98.1%;
VHR-3 = 97.8%.

Comparative Example 2

The compound similar to compound (4) of Comparative Example (1) was replaced with compound (4). The composition was prepared and measured by the above method. The components and characteristics were as described below. Comparative Example (2) has a smaller viscosity than Comparative Example (1), but was less effective than Example 1.

| | | |
|---|---|---|
| 3-BB(2F,3F)-O2 | (1-1) | 10% |
| V2-BB(2F,3F)-O2 | (1-1) | 5% |
| 3-HHB(2F,3F)-O2 | (2-1-1) | 7% |
| 5-HHB(2F,3F)-O2 | (2-1-1) | 7% |
| 3-HH2B(2F,3F)-O2 | (2-2-1) | 6% |
| V-HBB(2F,3F)-O2 | (3-1-1) | 5% |
| 3-HH-V1 | Similar(4) | 14% |
| 3-HHB-1 | (5-4-1) | 5% |
| V-HHB-1 | (5-4-1) | 5% |
| 5-HBB(F)B-3 | (5-12-1) | 5% |
| 3-HB(2F,3F)-O2 | (6-1-1-1) | 10% |
| 5-HB(2F,3F)-O2 | (6-1-1-1) | 10% |
| 3-HVHH-2 | (—) | 3% |
| V-HVHB-1 | (—) | 8% |

NI = 97.3° C.;
Δn = 0.116;
η = 20.5 mPa · s;
Δε = −3.1;
VHR-1 = 98.9%;
VHR-2 = 98.2%;
VHR-3 = 97.9%.

Comparative Example 3

Example 7 was selected from the compositions disclosed in JP 2009-035630. The basis of selection is that the composition comprises of compound (1), compound (2), compound (4), compound (5) and compound (6-1). Components and characteristics of the composition were as described below.

| | | |
|---|---|---|
| V2-BB(2F,3F)-O2 | (1-1) | 5% |
| 3-HHB(2F,3F)-O2 | (2-1-1) | 5% |
| 3-HH-V | (4-2-1) | 24% |
| V2-BB-1 | (5-2-1) | 6% |
| V-HHB-1 | (5-4-1) | 5% |
| 3-BB(F)B-2V | (5-6-1) | 5% |
| 3-HB(2F,3F)-O2 | (6-1-1-1) | 13% |
| 5-HB(2F,3F)-O2 | (6-1-1-1) | 5% |

| | | |
|---|---|---|
| 2-HChB(2F,3F)-O2 | (—) | 7% |
| 3-HChB(2F,3F)-O2 | (—) | 14% |
| V-HChB(2F,3F)-O2 | (—) | 8% |
| 1O1-HBBH-5 | (—) | 3% |

NI = 86.3° C.;
Tc ≤ −20° C.;
Δn = 0.111;
η = 15.9 mPa · s;
Δε = −2.7.

Comparative Example 4

Example 6 was selected from the compositions disclosed in JP 2008-024815. The basis of selection is that the composition comprises of compound (1), and compound (5). Components and characteristics of the composition were as described below.

| | | |
|---|---|---|
| 3-BB(2F,3F)-O2 | (1-1) | 15% |
| 5-BB(2F,3F)-O2 | (1-1) | 15% |
| 5-HBB(F)B-2 | (5-12-1) | 12% |
| 5-HBB(F)B-3 | (5-12-1) | 12% |
| 2-BB(2F,3F)B-3 | (—) | 5% |
| 2-BB(2F,3F)B-4 | (—) | 10% |
| 5-BB(2F,3F)B-2 | (—) | 10% |
| 3-B2B(2F,3F)-O2 | (—) | 11% |
| 5-B2B(2F,3F)-O2 | (—) | 10% |

NI = 84.2° C.;
Tc ≤ −20° C.;
Δn = 0.197;
η = 35.7 mPa · s;
Δε = −3.6.

Comparative Example 5

Example 3 was selected from the compositions disclosed in JP 2003-327965. The basis of selection is that the composition comprises of compound (1), compound (3) and compound (4), compound (5) and compound (6-1). The composition was prepared and measured by the above method. Components and characteristics of the composition were as described below.

| | | |
|---|---|---|
| 5-BB(2F,3F)-O4 | (1-1) | 5% |
| 2-HBB(2F,3F)-O2 | (3-1-1) | 11% |
| 3-HBB(2F,3F)-O2 | (3-1-1) | 12% |
| 5-HH-V | (4-2-1) | 12% |
| 3-HH-V1 | Similar(4) | 12% |
| 5-HB-3 | (5-1-1) | 7% |
| 1V2-BB-1 | (5-2-1) | 7% |
| 3-HBB-2 | (5-5-1) | 5% |
| 5-HB(2F,3F)-O2 | (6-1-1-1) | 5% |
| 5-HB(2F,3F)-O4 | (6-1-1-1) | 10% |
| 2-BB(2F)B(2F,3F)-1 | (—) | 7% |
| 3-BB(2F)B(2F,3F)-1 | (—) | 7% |

NI = 74.3° C.;
Tc ≤ −20° C.;
Δn = 0.126;
η = 17.9 mPa · s;
Δε = −2.8.

Comparative Example 6

Example M8 was selected from the compositions disclosed in JP 2008-505235. The basis of selection is that the composition comprises of compound (1), compound (3) and compound (5). The composition was prepared and measured by the above method. Components and characteristics of the composition were as described below.

| | | |
|---|---|---|
| 3-BB(2F,3F)-O2 | (1-1) | 19% |
| 5-BB(2F,3F)-O2 | (1-1) | 17% |
| 2-HBB(2F,3F)-O2 | (3-1-1) | 12% |
| 3-HBB(2F,3F)-O2 | (3-1-1) | 13% |
| 1-BB-4 | (5-2-1) | 7% |
| V-HHB-1 | (5-4-1) | 10% |
| 3-HBB-2 | (5-5-1) | 10% |
| 3-HH-V1 | Similar(4) | 12% |

NI = 72.3° C.;
Tc ≤ −10° C.;
Δn = 0.147;
η = 20.3 mPa · s;
Δε = −3.4.

Example 2

| | | |
|---|---|---|
| 3-BB(2F,3F)-O2 | (1-1) | 5% |
| 5-BB(2F,3F)-O2 | (1-1) | 5% |
| 5-HHB(2F,3F)-O2 | (2-1-1) | 9% |
| 2-HHB(2F,3F)-1 | (2-1-1) | 8% |
| 3-HHB(2F,3F)-1 | (2-1-1) | 8% |
| V2-HHB(2F,3F)-O2 | (2-1-1) | 5% |
| 3-HBB(2F,3F)-O2 | (3-1-1) | 10% |
| 1V2-HBB(2F,3F)-O2 | (3-1-1) | 5% |
| 1V2-HBB(2F,3F)-1 | (3-1-1) | 5% |
| 3-HH-4 | (4-1-1) | 10% |
| 3-HH-5 | (4-1-1) | 7% |
| 3-HH-O1 | (4-1-1) | 3% |
| 3-HH-V | (4-2-1) | 20% |

NI = 92.1° C.;
Tc ≤ −20° C.;
Δn = 0.101;
η = 15.8 mPa · s;
Δε = −3.3;
VHR-1 = 99.3%;
VHR-2 = 98.2%;
VHR-3 = 98.1%.

Example 3

| | | |
|---|---|---|
| 3-BB(2F,3F)-O2 | (1-1) | 3% |
| 5-BB(2F,3F)-O2 | (1-1) | 4% |
| 1V2-BB(2F,3F)-O2 | (1-1) | 5% |
| 2-HHB(2F,3F)-O2 | (2-1-1) | 3% |
| 3-HHB(2F,3F)-O2 | (2-1-1) | 3% |
| 1V2-HHB(2F,3F)-O2 | (2-1-1) | 4% |
| 5-HHB(2F,3CL)-O2 | (2) | 3% |
| 3-HH2B(2F,3F,6Me)-O2 | (2) | 2% |
| 3-HBB(2F,3F)-O2 | (3-1-1) | 7% |
| 3-HBB(2F,3F)-O3 | (3-1-1) | 5% |
| 5-HBB(2F,3F)-O2 | (3-1-1) | 7% |
| 1V2-HBB(2F,3F)-O2 | (3-1-1) | 5% |
| 3-HH-4 | (4-1-1) | 15% |
| 3-HH-5 | (4-1-1) | 7% |
| 3-HH-V | (4-2-1) | 10% |
| 5-HH-V | (4-2-1) | 17% |

NI = 92.0° C.;
Tc ≤ −20° C.;
Δn = 0.100;
η = 15.9 mPa · s;
Δε = −3.4;
VHR-1 = 99.2%;
VHR-2 = 98.1%;
VHR-3 = 97.9%.

Example 4

| | | |
|---|---|---|
| 2-BB(2F,3F)-O2 | (1-1) | 8% |
| 5-BB(2F,3F)-O2 | (1-1) | 5% |
| 2-HHB(2F,3F)-O2 | (2-1-1) | 8% |
| 5-HHB(2F,3F)-O2 | (2-1-1) | 5% |
| 1V2-HHB(2F,3F)-O2 | (2-1-1) | 5% |
| 3-HHB(2CL,3F)-O2 | (2) | 2% |
| 3-HBB(2F,3F)-O2 | (3-1-1) | 5% |
| 5-HBB(2F,3F)-O2 | (3-1-1) | 5% |
| 3-HH-5 | (4-1-1) | 7% |
| 3-HH-V | (4-2-1) | 20% |
| 3-HB-O1 | (5-1-1) | 5% |
| V2-BB-1 | (5-2-1) | 5% |
| 3-HHEH-5 | (5-3-1) | 3% |
| 3-HHB-O1 | (5-4-1) | 4% |
| 2-BB(F)B-3 | (5-6-1) | 5% |
| 5-B(F)BB-2 | (5-7-1) | 5% |
| 3-HHEBH-3 | (5-8-1) | 3% |

NI = 92.8° C.;
Tc ≤ −20° C.;
Δn = 0.120;
η = 15.6 mPa · s;
Δε = −2.8;
VHR-1 = 99.4%;
VHR-2 = 98.3%;
VHR-3 = 98.1%.

Example 5

| | | |
|---|---|---|
| 2-BB(2F,3F)-O2 | (1-1) | 5% |
| 3-BB(2F,3F)-O2 | (1-1) | 7% |
| 5-BB(2F,3F)-O2 | (1-1) | 3% |
| V2-BB(2F,3F)-O2 | (1-1) | 4% |
| 2-HHB(2F,3F)-O2 | (2-1-1) | 5% |
| 5-HHB(2F,3F)-O2 | (2-1-1) | 5% |
| 1V2-HHB(2F,3F)-O2 | (2-1-1) | 3% |
| 2-HBB(2F,3F)-O2 | (3-1-1) | 5% |
| 3-HBB(2F,3F)-O2 | (3-1-1) | 6% |
| 2-HH-3 | (4-1-1) | 7% |
| 3-HH-V | (4-2-1) | 20% |
| 3-HH-VFF | (4) | 3% |
| 1V2-BB-1 | (5-2-1) | 5% |
| 3-HHB-1 | (5-4-1) | 5% |
| 3-HBB-2 | (5-5-1) | 3% |
| 3-B(F)BB-2V | (5-7-1) | 5% |
| 3-HBBH-3 | (5-9-1) | 3% |
| 3-HB(F)HH-5 | (5-10-1) | 3% |
| 5-HBB(F)B-3 | (5-12-1) | 3% |

NI = 91.6° C.;
Tc ≤ −20° C.;
Δn = 0.125;
η = 15.3 mPa · s;
Δε = −2.8;
VHR-1 = 99.3%;
VHR-2 = 98.1%;
VHR-3 = 98.2%.

Example 6

| | | |
|---|---|---|
| 5-BB(2F,3F)-O2 | (1-1) | 3% |
| 1V2-BB(2F,3F)-O2 | (1-1) | 4% |
| 1V2-HHB(2F,3F)-O2 | (2-1-1) | 5% |
| 3-HH2B(2F,3F)-O2 | (2-2-1) | 7% |
| 5-HH2B(2F,3F)-O2 | (2-2-1) | 7% |
| 3-HBB(2F,3F)-O2 | (3-1-1) | 6% |

-continued

| | | |
|---|---|---|
| 5-HBB(2F,3F)-O2 | (3-1-1) | 5% |
| 3-HH-V | (4-2-1) | 21% |
| V-BB-1 | (5-2-1) | 5% |
| V2-BB-1 | (5-2-1) | 5% |
| 3-HHB-1 | (5-4-1) | 5% |
| 3-BB(F)B-2V | (5-6-1) | 5% |
| 5-HB(F)BH-3 | (5-11-1) | 3% |
| 5-HB(2F,3F)-O2 | (6-1-1-1) | 8% |
| 5-H2B(2F,3F)-O2 | (6-1-2-1) | 8% |
| 1O1-HBBH-5 | (—) | 3% |

NI = 91.9° C.;
Tc ≤ −20° C.;
Δn = 0.120;
η = 14.9 mPa · s;
Δε = −2.8;
VHR-1 = 99.2%;
VHR-2 = 97.8%;
VHR-3 = 97.9%.

Example 7

| | | |
|---|---|---|
| 1V2-BB(2F,3F)-O2 | (1-1) | 5% |
| 2-HHB(2F,3F)-O2 | (2-1-1) | 3% |
| 5-HHB(2F,3F)-O2 | (2-1-1) | 3% |
| 1V2-HHB(2F,3F)-O2 | (2-1-1) | 5% |
| 5-HH2B(2F,3F)-O2 | (2-2-1) | 7% |
| 5-HBB(2F,3F)-O2 | (3-1-1) | 5% |
| V-HBB(2F,3F)-O2 | (3-1-1) | 3% |
| 3-HH-V | (4-2-1) | 21% |
| V-BB-1 | (5-2-1) | 10% |
| V2-BB-1 | (5-2-1) | 5% |
| 3-HHB-1 | (5-4-1) | 5% |
| 3-BB(F)B-2V | (5-6-1) | 5% |
| 3-HHEBH-3 | (5-8-1) | 3% |
| 5-HB(F)HH-V | (5-10-1) | 3% |
| 3-H2B(2F,3F)-O2 | (6-1-2-1) | 8% |
| 3-H1OB(2F,3F)-O2 | (6-1-3-1) | 3% |
| 3-HH2Cro(7F,8F)-5 | (6-2-3-1) | 3% |
| 3-HH1OCro(7F,8F)-5 | (6-2-4-1) | 3% |

NI = 91.7° C.;
Tc ≤ −20° C.;
Δn = 0.117;
η = 14.4 mPa · s;
Δε = −2.8;
VHR-1 = 99.1%;
VHR-2 = 97.7%;
VHR-3 = 97.8%.

Example 8

| | | |
|---|---|---|
| 5-BB(2F,3F)-O2 | (1-1) | 3% |
| V2-BB(2F,3F)-O2 | (1-1) | 7% |
| 5-HHB(2F,3F)-O2 | (2-1-1) | 3% |
| V-HHB(2F,3F)-O2 | (2-1-1) | 6% |
| 1V2-HHB(2F,3F)-O2 | (2-1-1) | 5% |
| 5-HH2B(2F,3F)-O2 | (2-2-1) | 5% |
| V2-HBB(2F,3F)-O2 | (3-1-1) | 3% |
| 1V2-HBB(2F,3F)-O2 | (3-1-1) | 3% |
| 3-HH-V | (4-2-1) | 20% |
| V-BB-1 | (5-2-1) | 10% |
| 1V2-BB-1 | (5-2-1) | 5% |
| V2-HHB-1 | (5-4-1) | 5% |
| 1V-HBB-2 | (5-5-1) | 2% |
| 3-B(F)BB-2V | (5-7-1) | 4% |
| 3-HHEBH-3 | (5-8-1) | 5% |
| 3-HHEBH-5 | (5-8-1) | 3% |
| V-HB(2F,3F)-O2 | (6-1-1-1) | 5% |

-continued

| | | |
|---|---|---|
| 5-H2Cro(7F,8F)-5 | (6-2-1-1) | 3% |
| 5-H1OCro(7F,8F)-5 | (6-2-2-1) | 3% |

NI = 92.1° C.;
Tc ≤ −20° C.;
Δn = 0.120;
η = 14.7 mPa · s;
Δε = −3.1;
VHR-1 = 99.2%;
VHR-2 = 97.7%;
VHR-3 = 97.9%.

Example 9

| | | |
|---|---|---|
| 3-BB(2F,3F)-O2 | (1-1) | 5% |
| V2-BB(2F,3F)-O2 | (1-1) | 5% |
| 5-HHB(2F,3F)-O2 | (2-1-1) | 4% |
| V-HHB(2F,3F)-O2 | (2-1-1) | 5% |
| 1V2-HHB(2F,3F)-O2 | (2-1-1) | 5% |
| V2-HBB(2F,3F)-O2 | (3-1-1) | 3% |
| 1V2-HBB(2F,3F)-O4 | (3-1-1) | 3% |
| 3-HH-V | (4-2-1) | 20% |
| V-BB-1 | (5-2-1) | 10% |
| 1V2-BB-3 | (5-2-1) | 5% |
| V-HHB-1 | (5-4-1) | 8% |
| 3-HHEBH-3 | (5-8-1) | 5% |
| 3-HHEBH-4 | (5-8-1) | 3% |
| 3-HHEBH-5 | (5-8-1) | 3% |
| 3V-HB(2F,3F)-O2 | (6-1-1-1) | 8% |
| 8-H1OB(2F,3F)-O2 | (6-1-3-1) | 5% |
| 5-HB1OCro(7F,8F)-5 | (6-2-5-1) | 3% |

NI = 92.0° C.;
Tc ≤ −20° C.;
Δn = 0.115;
η = 14.9 mPa · s;
Δε = −2.9;
VHR-1 = 99.1%;
VHR-2 = 97.9%;
VHR-3 = 97.7%.

Example 10

| | | |
|---|---|---|
| 3-BB(2F,3F)-O2 | (1-1) | 5% |
| 1V2-BB(2F,3F)-O2 | (1-1) | 5% |
| V-HHB(2F,3F)-O2 | (2-1-1) | 5% |
| 1V2-HHB(2F,3F)-O2 | (2-1-1) | 5% |
| V2-HBB(2F,3F)-O2 | (3-1-1) | 3% |
| 5-HBB(2F,3CL)-O2 | (3) | 3% |
| 3-HH-V | (4-2-1) | 20% |
| V-BB-1 | (5-2-1) | 10% |
| 1V2-BB-1 | (5-2-1) | 5% |
| V2-HHB-1 | (5-4-1) | 8% |
| 3-HHEBH-3 | (5-8-1) | 5% |
| 3-HHEBH-4 | (5-8-1) | 3% |
| 3-HHEBH-5 | (5-8-1) | 3% |
| 5-HB(F)HH-V | (5-10-1) | 3% |
| 5-H2B(2F,3F)-O2 | (6-1-2-1) | 8% |
| 5-H2B(2CL,3F)-O2 | (6-1) | 3% |
| 5-H1OB(2F,3CL)-O2 | (6-1) | 3% |
| 4O-Cro(7F,8F)H-3 | (6-2) | 3% |

NI = 92.1° C.;
Tc ≤ −20° C.;
Δn = 0.112;
η = 14.7 mPa · s;
Δε = −3.0;
VHR-1 = 99.1%;
VHR-2 = 97.7%;
VHR-3 = 97.6%.

The compositions of Examples 1 to 10 have a larger maximum temperature and a smaller viscosity than Comparative Examples 1, 4 to 6, and have a larger maximum temperature, a negatively larger dielectric anisotropy than Comparative Example 3. Thus, the liquid crystal composition according to the invention is so much superior in characteristics to the liquid crystal compositions described in Patent literatures No. 1 to No. 5.

INDUSTRIAL APPLICABILITY

The invention provides a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat, or provides a liquid crystal composition having a suitable balance regarding at least two of the characteristics. A liquid crystal display device containing such a liquid crystal composition is applied as an AM device having a short response time, a large voltage holding ratio, a large contrast ratio, a long service life and so forth, and thus can be used for a liquid crystal projector, a liquid crystal television and so forth.

What is claimed is:

1. A liquid crystal composition that has a negative dielectric anisotropy and contains at least one compound selected from the group of compounds represented by formula (1) as a first component, at least one compound selected from the group of compounds represented by formula (2) as a second component, at least one compound selected from the group of compounds represented by formula (3) as a third component and at least one compound selected from the group of compounds represented by formula (4-2) as a fourth component:

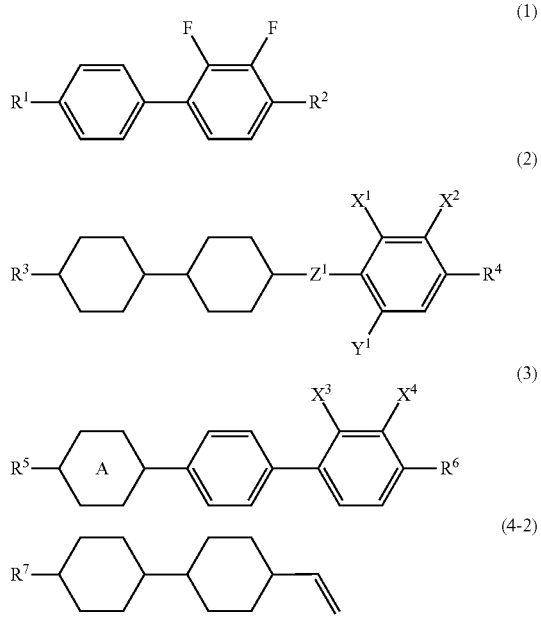

wherein $R^1$, $R^3$ and $R^5$ are independently alkyl having 1 to 12 carbons, alkoxy having 1 to 12 carbons, or alkenyl containing only one double bond and having 2 to 12 carbons; $R^2$, $R^4$, and $R^6$ are independently alkyl having 1 to 12 carbons, alkoxy having 1 to 12 carbons, or alkenyl having 2 to 12 carbons; $R^7$ is independently alkyl having 1 to 12 carbons or alkoxy having 1 to 12 carbons; ring A is 1,4-cycrohexylene, or 1,4-pnenylene; $X^1$, $X^2$, $X^3$ and $X^4$ are independently fluorine or chlorine; $Y^1$ is independently hydrogen or methyl; $Z^1$ is independently a single bond or ethylene.

2. The liquid crystal composition according to claim 1, wherein the second component is at least one compound selected from the group of compounds represented by formula (2-1) or formula (2-2):

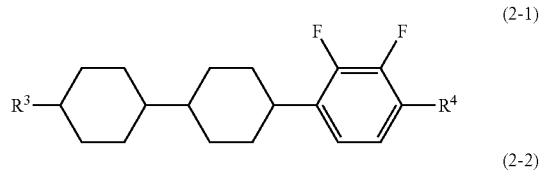

wherein $R^3$ and $R^4$ are independently alkyl having 1 to 12 carbons, alkoxy having 1 to 12 carbons, or alkenyl having 2 to 12 carbons.

3. The liquid crystal composition according to claim 1, wherein the third component is at least one compound selected from the group of compounds represented by formula (3-1):

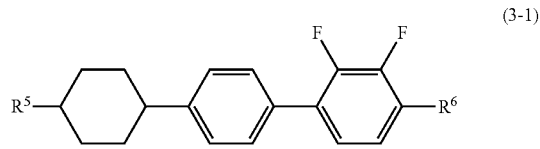

wherein $R^5$ and $R^6$ are independently alkyl having 1 to 12 carbons, alkoxy having 1 to 12 carbons, or alkenyl having 2 to 12 carbons.

4. The liquid crystal composition according to claim 2, wherein the second component is at least one compound selected from the group of compounds represented by formula (2-1).

5. The liquid crystal composition according to claim 2, wherein the second component is at least one compound selected from the group of compounds represented by formula (2-2).

6. The liquid crystal composition according to claim 1, wherein a ratio of the first component is in the range of 10% by weight to 75% by weight, and a ratio of the second component is in the range of 10% by weight to 75% by weight, a ratio of the third component is in the range of 5% by weight to 70% by weight and a ratio of the fourth component is in the range of 10% by weight to 75% by weight based on the total weight of the liquid crystal composition.

7. The liquid crystal composition according to claim 1, further containing at least one compound selected from the group of compounds represented by formula (5) as a fifth component:

(5)

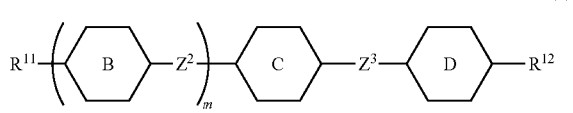

wherein $R^{11}$ and $R^{12}$ are independently alkyl having 1 to 12 carbons, alkoxy having 1 to 12 carbons, alkenyl having 2 to 12 carbons or alkenyl having 2 to 12 carbons in which hydrogen is replaced with fluorine; ring B, ring C or ring D are independently 1,4-cyclohexylene, 1,4-phenylene, 2-fluoro-1,4 phenylene, or 3-fluoro-1,4 phenylene; $Z^2$ and $Z^3$ are independently a single bond, ethylene, methyleneoxy or carbonyloxy; m is 0, 1 or 2 and at least one of ring C and ring D is 1,4-phenylene when m is 0.

8. The liquid crystal composition according to claim 7, wherein the fifth component is at least one compound selected from the group of compounds represented by formula (5-1) to formula (5-12):

(5-1)
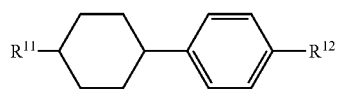

(5-2)
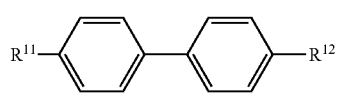

(5-3)
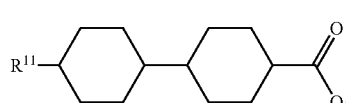

(5-4)

(5-5)

(5-6)
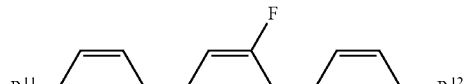

(5-7)

(5-8)
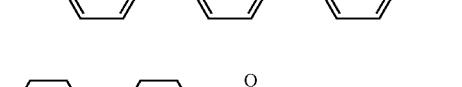

(5-9)
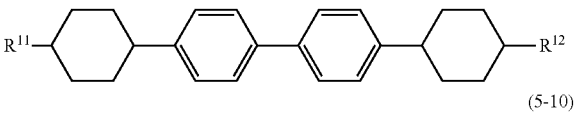

(5-10)
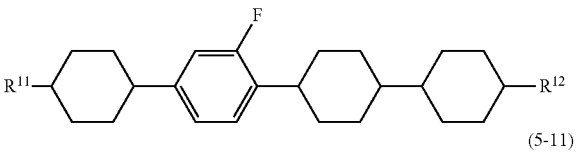

(5-11)
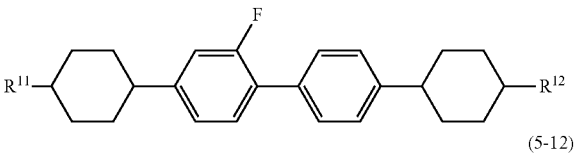

(5-12)
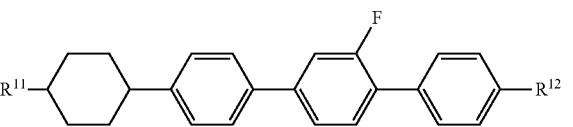

wherein $R^{11}$ and $R^{12}$ are independently alkyl having 1 to 12 carbons, alkoxy having 1 to 12 carbons, alkenyl having 2 to 12 carbons or alkenyl having 2 to 12 carbons in which hydrogen is replaced with fluorine.

9. The liquid crystal composition according to claim 7, wherein a ratio of the fifth component is in the range of 5% by weight to 40% by weight based on the total weight of the liquid crystal composition.

10. The liquid crystal composition according to claim 1, further containing at least one compound selected from the group of compounds represented by formula (6-1) or formula (6-2) as a sixth component:

(6-1)
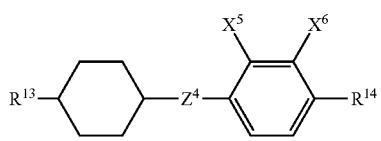

(6-2)
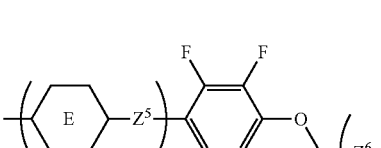

wherein $R^{13}$ and $R^{14}$ are independently alkyl having 1 to 12 carbons, alkoxy having 1 to 12 carbons or alkenyl having 2 to 12 carbons;
ring E and ring F are independently 1,4-cyclohexylene or 1,4-phenylene; $Z^4$ is independently a single bond, ethylene or methyleneoxy; $Z^5$ and $Z^6$ are independently a single bond, ethylene, methyleneoxy or carbonyloxy; $X^5$ and $X^6$ are independently fluorine or chlorine; p is 0, 1 or 2, q is 0 or 1, and the sum of p and q is 1 or 2.

11. The liquid crystal composition according to claim 10, wherein the sixth component is at least one compound selected from the group of compounds represented by formula (6-1-1) to formula (6-1-3) and formula (6-2-1) to formula (6-2-5)

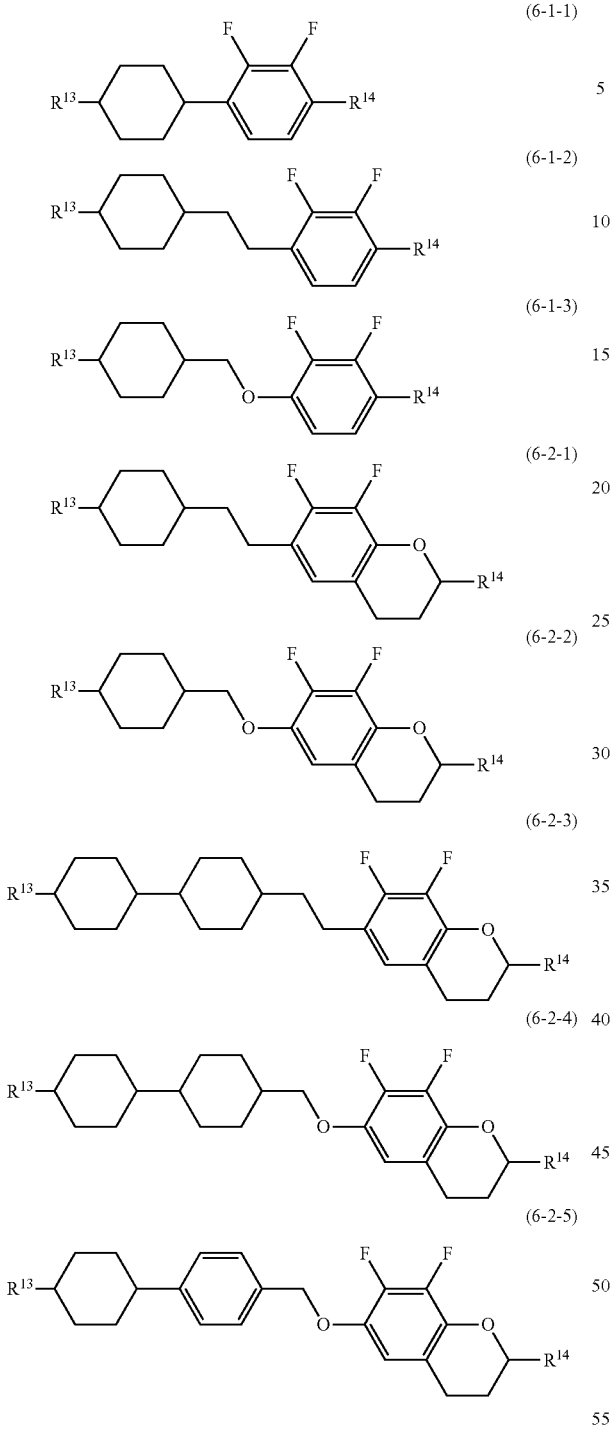

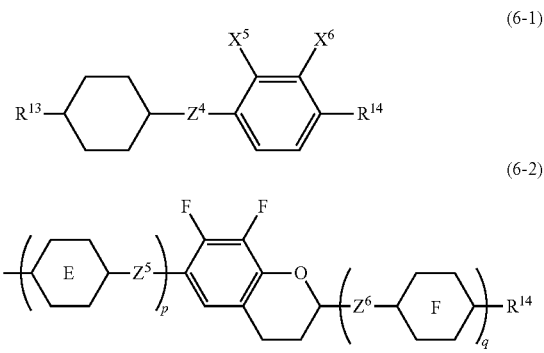

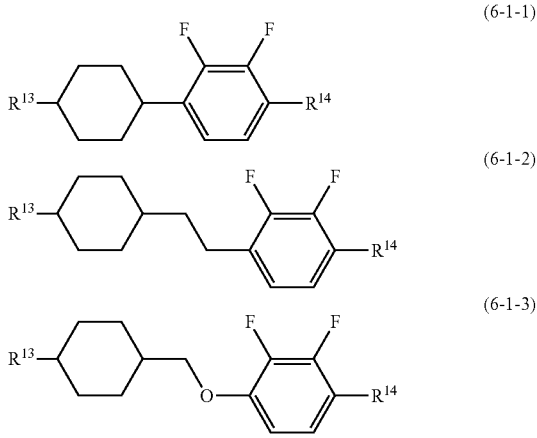

wherein $R^{13}$ and $R^{14}$ are independently alkyl having 1 to 12 carbons, alkoxy having 1 to 12 carbons or alkenyl having 2 to 12 carbons.

12. The liquid crystal composition according to claim 10, wherein a ratio of the sixth component is in the range of 5% by weight to 40% by weight based on the total weight of the liquid crystal composition.

13. The liquid crystal composition according to claim 1, wherein a maximum temperature of a nematic phase is 70° C. or higher, an optical anisotropy (25° C.) at a wavelength of 589 nanometers is 0.08 or more and a dielectric anisotropy (25° C.) at a frequency of 1 kHz is −2 or less.

14. A liquid crystal display device, containing the liquid crystal composition according to claim 1.

15. The liquid crystal display device according to claim 14, wherein an operating mode in the liquid crystal display device is a VA mode, an IPS mode, an FFS mode or a PSA mode, and a driving mode in the liquid crystal display device is an active matrix mode.

16. The liquid crystal composition according to claim 7, further containing at least one compound selected from the group of compounds represented by formula (6-1) or formula (6-2) as a sixth component:

wherein $R^{13}$ and $R^{14}$ are independently alkyl having 1 to 12 carbons, alkoxy having 1 to 12 carbons or alkenyl having 2 to 12 carbons;

ring E and ring F are independently 1,4-cyclohexylene or 1,4-phenylene; $Z^4$ is independently a single bond, ethylene or methyleneoxy; $Z^5$ and $Z^6$ are independently a single bond, ethylene, methyleneoxy or carbonyloxy; $X^5$ and $X^6$ are independently fluorine or chlorine; p is 0, 1 or 2, q is 0 or 1, and the sum of p and q is 1 or 2.

17. The liquid crystal composition according to claim 16, wherein the sixth component is at least one compound selected from the group of compounds represented by formula (6-1-1) to formula (6-1-3) and formula (6-2-1) to formula (6-2-5)

-continued
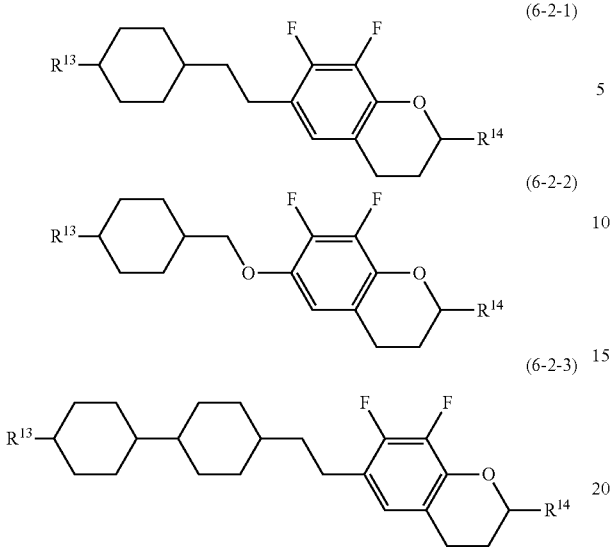
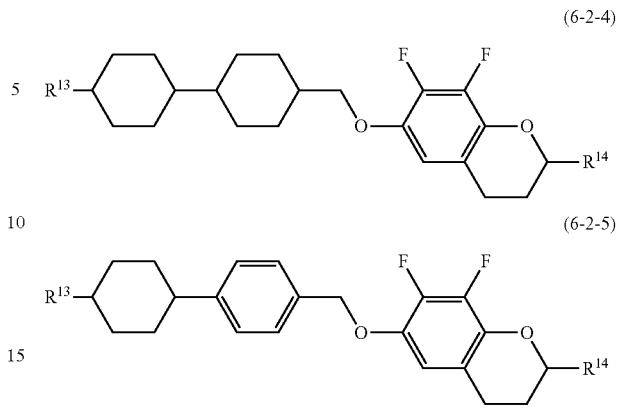
wherein $R^{13}$ and $R^{14}$ are independently alkyl having 1 to 12 carbons, alkoxy having 1 to 12 carbons or alkenyl having 2 to 12 carbons.
* * * * *